United States Patent
Cha et al.

(10) Patent No.: US 11,979,845 B2
(45) Date of Patent: May 7, 2024

(54) METHOD FOR TRANSMITTING AND RECEIVING SIGNAL IN WIRELESS COMMUNICATION SYSTEM AND APPARATUS SUPPORTING SAME

(71) Applicant: LG ELECTRONICS INC., Seoul (KR)

(72) Inventors: Hyunsu Cha, Seoul (KR); Sukhyon Yoon, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 17/425,797

(22) PCT Filed: Feb. 3, 2020

(86) PCT No.: PCT/KR2020/001596
§ 371 (c)(1),
(2) Date: Jul. 26, 2021

(87) PCT Pub. No.: WO2020/159339
PCT Pub. Date: Aug. 6, 2020

(65) Prior Publication Data
US 2022/0174641 A1    Jun. 2, 2022

(30) Foreign Application Priority Data
Feb. 1, 2019    (KR) .................. 10-2019-0013555

(51) Int. Cl.
*H04W 64/00*    (2009.01)
*H04L 5/00*    (2006.01)

(52) U.S. Cl.
CPC .......... *H04W 64/00* (2013.01); *H04L 5/0048* (2013.01); *H04L 5/006* (2013.01); *H04L 5/0094* (2013.01)

(58) Field of Classification Search
CPC ...... H04W 64/00; H04L 5/0048; H04L 5/006; H04L 5/0049
(Continued)

(56) References Cited

U.S. PATENT DOCUMENTS

| 2018/0324738 | A1* | 11/2018 | Stirling-Gallacher ...................... G01S 5/0205 |
| 2021/0136787 | A1* | 5/2021 | Opshaug ............... H04L 5/0032 |
| 2021/0185632 | A1* | 6/2021 | Manolakos ........... H04L 5/0094 |

FOREIGN PATENT DOCUMENTS

| WO | 2016159713 A1 | 10/2016 |
| WO | 2017026672 A1 | 2/2017 |

OTHER PUBLICATIONS

Sony, "Considerations on Downlink based Positioning in NR", 3GPP TSG RAN WG1 Ad-Hoc Meeting 1901, Jan. 21-25, 2019, R1-1900384.
(Continued)

*Primary Examiner* — Ted M Wang
(74) *Attorney, Agent, or Firm* — BRYAN CAVE LEIGHTON PAISNER LLP

(57) ABSTRACT

A method for an apparatus in a wireless communication system according to an embodiment comprises the steps of: receiving information on a transmission time point of a plurality of positioning reference signal (PRS) resources included in at least one PRS resource set; measuring information associated with positioning for each of the plurality of PRS resources, on the basis of the information on the transmission time point; and on the basis of the information associated with the positioning, transmitting at least one from among an identifier (ID) of a specific PRS resource of the plurality of PRS resources, or an ID of a PRS resource set including the specific PRS resource, and a transmission and reception point (TRP) ID associated with the PRS resource set including the specific PRS resource. The UE is
(Continued)

capable of communicating with at least one of another UE, a UE related to an autonomous driving vehicle, the BS or a network.

18 Claims, 31 Drawing Sheets

(58) Field of Classification Search
USPC .................................................... 455/456.1
See application file for complete search history.

(56) References Cited

OTHER PUBLICATIONS

Intel Corporation, "Analysis of Techniques for NR DL Positioning", 3GPP TSG RAN WG1 Ad-Hoc Meeting 1901, Jan. 21-25, 2019, R1-1900512.

LG Electronics, "Discussions on DL only based Positioning", 3GPP TSG RAN WG1 Ad-Hoc Meeting 1901, Jan. 21-25, 2019, R1-1900629.

* cited by examiner

FIG. 7
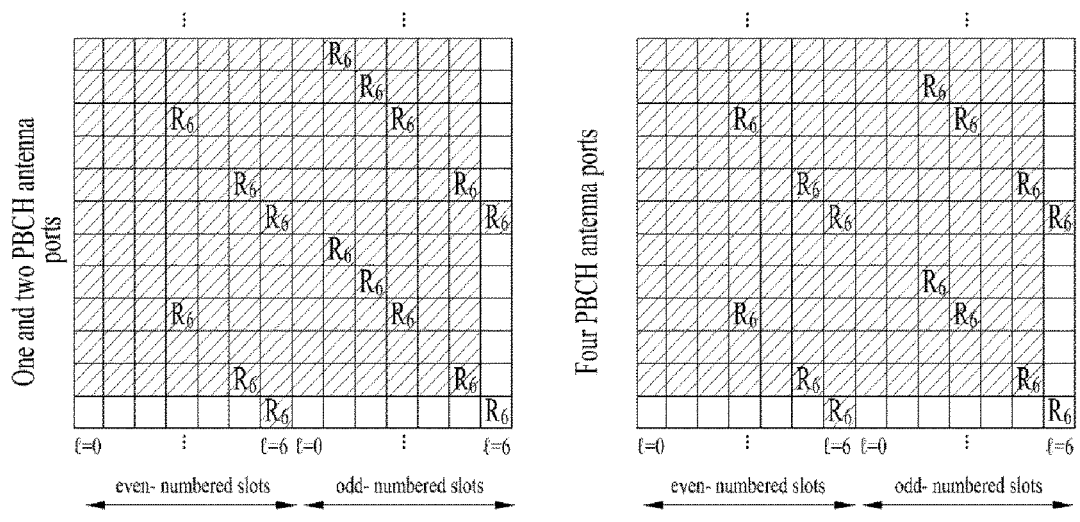
(a)
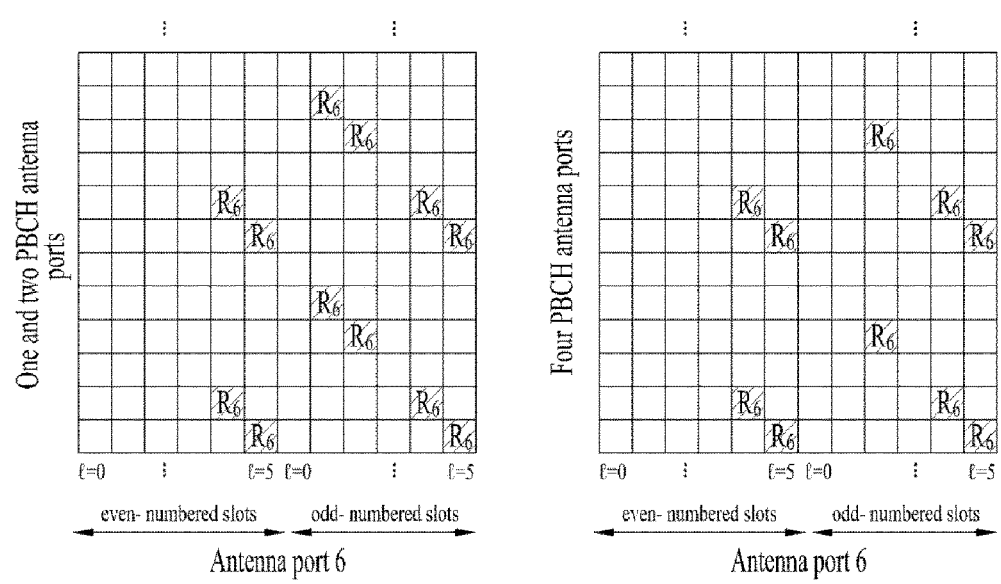
(b)

FIG. 21
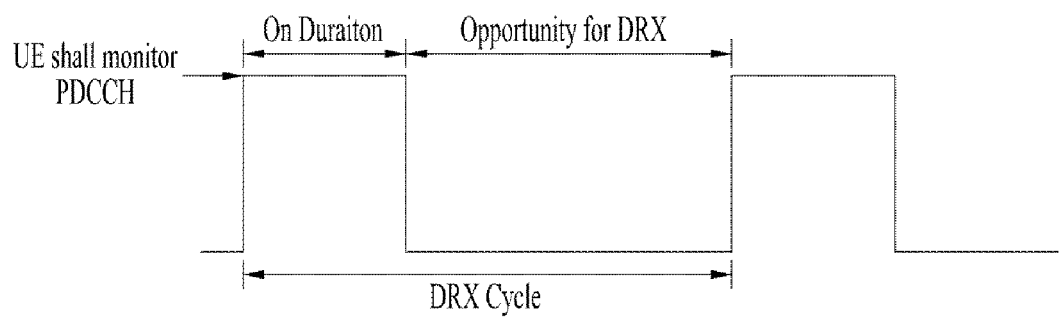
(a)
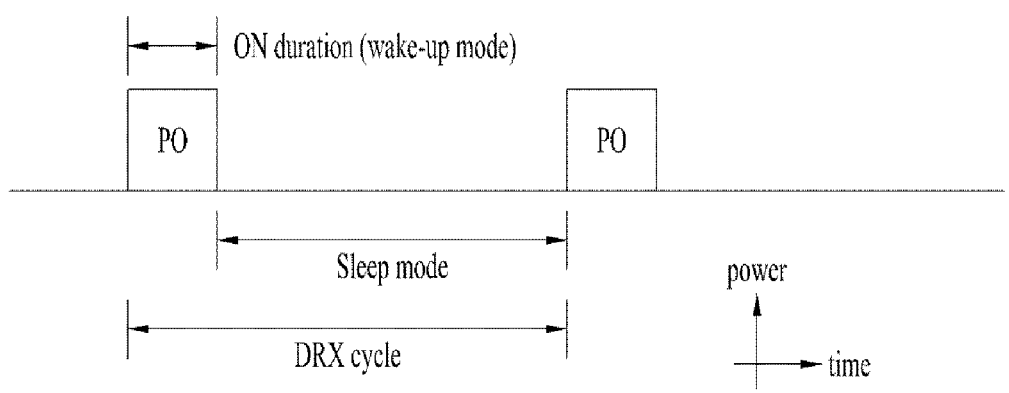
(b)

METHOD FOR TRANSMITTING AND RECEIVING SIGNAL IN WIRELESS COMMUNICATION SYSTEM AND APPARATUS SUPPORTING SAME

This application is the National Stage filing under 35 U.S.C. 371 of International Application No. PCT/KR2020/001596, filed on Feb. 3, 2020, which claims the benefit of Korean Application No. 10-2019-0013555, filed on Feb. 1, 2019, the contents of which are all hereby incorporated by reference herein in their entirety.

TECHNICAL FIELD

The present disclosure relates to a wireless communication system, and more particularly, to a method of transmitting and receiving a signal in a wireless communication system and apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more and more communication devices require greater communication capacity, there is a need for mobile broadband communication enhanced over conventional Radio Access Technology (RAT). In addition, massive Machine Type Communications (MTC) capable of providing a variety of services anywhere and anytime by connecting multiple devices and objects is one of important issues to be considered in the next-generation communications.

As described above, the introduction of the next generation RAT considering the enhanced mobile broadband communication, massive MTC, Ultra-reliable and low latency communication (URLLC), and the like has been discussed.

DISCLOSURE

Technical Problem

Various embodiments of the present disclosure may provide a method of transmitting and receiving a signal in a wireless communication system and apparatus for supporting the same Specifically, various embodiments of the present disclosure may provide a method of transmitting at least any one of an identifier (ID) of a specific positioning reference signal (PRS) resource and an ID of a PRS resource set including the specific PRS resource based on positioning related information in a wireless communication system and apparatus for supporting the same.

The technical objects that could be achieved through the present disclosure are not limited to what has been particularly described hereinabove and other technical objects not described herein will be more clearly understood by persons skilled in the art from the following detailed description.

Technical Solution

Various embodiments of the present disclosure may provide a method of transmitting and receiving a signal in a wireless communication system and apparatus for supporting the same In one aspect of the present disclosure, a method performed by an apparatus in a wireless communication system is provided. The method may include: receiving information on transmission times of a plurality of positioning reference signal (PRS) resources included in one or more PRS resource sets; measuring positioning related information for each of the plurality of PRS resources, based on the information on the transmission times; and transmitting at least any one of an identifier (ID) of a specific PRS resource among the plurality of PRS resources and an ID of a PRS resource set including the specific PRS resource and an ID of a transmission and reception point (TRP) related to the PRS resource set including the specific PRS resource, based on the positioning related information.

The specific PRS resource may be M PRS resources in descending order of positioning related information quality among the plurality of PRS resources, and M may be a natural number.

The specific PRS resource may be PRS resources with positioning related information quality more than or equal to a predetermined value among the plurality of PRS resources.

The positioning related information may include transmission and reception time difference information, and the transmission and reception time difference information may be a difference between a time at which a PRS is received on the specific PRS resource and a time at which the positioning related information measured for the specific PRS resource is transmitted.

The specific PRS resource may be a PRS resource on which a PRS with a minimum time of arrival (ToA) among a plurality of PRSs received on the plurality of PRS resources is received.

The positioning related information may include a reference signal time difference (RSTD).

The one or more PRS resource sets may be related to beam combinations of one or more transmission beams and one or more reception beams, and the positioning related information for the specific PRS resource and the ID of the specific PRS resource may be configured to be transmitted for each of the one or more PRS resource sets.

In another aspect of the present disclosure, an apparatus configured to operate in a wireless communication system is provided. The apparatus may include: a memory; and one or more processors connected to the memory.

The one or more processors may be configured to: receive information on transmission times of a plurality of PRS resources included in one or more PRS resource sets; measure positioning related information for each of the plurality of PRS resources, based on the information on the transmission times; and transmit at least any one of an ID of a specific PRS resource among the plurality of PRS resources and an ID of a PRS resource set including the specific PRS resource and an ID of a TRP related to the PRS resource set including the specific PRS resource, based on the positioning related information.

The specific PRS resource may be M PRS resources in descending order of positioning related information quality among the plurality of PRS resources, and M may be a natural number.

The specific PRS resource may be PRS resources with positioning related information quality more than or equal to a predetermined value among the plurality of PRS resources.

The positioning related information may include transmission and reception time difference information, and the transmission and reception time difference information may be a difference between a time at which a PRS is received on the specific PRS resource and a time at which the positioning related information measured for the specific PRS resource is transmitted.

The apparatus may be configured to communicate with at least one of a mobile terminal, a network, or an autonomous driving vehicle other than a vehicle including the apparatus.

In another aspect of the present disclosure, provided is an apparatus for use in a wireless communication system. The apparatus may include: one or more processors; and one or more memories configured to store one or more instructions that cause the one or more processors to perform a method. The method may include: receiving information on transmission times of a plurality of PRS resources included in one or more PRS resource sets; measuring positioning related information for each of the plurality of PRS resources, based on the information on the transmission times; and transmitting at least any one of an ID of a specific PRS resource among the plurality of PRS resources and an ID of a PRS resource set including the specific PRS resource and an ID of a TRP related to the PRS resource set including the specific PRS resource, based on the positioning related information.

The specific PRS resource may be M PRS resources in descending order of positioning related information quality among the plurality of PRS resources, and M may be a natural number.

The specific PRS resource may be PRS resources with positioning related information quality more than or equal to a predetermined value among the plurality of PRS resources.

In another aspect of the present disclosure, a method performed by an apparatus in a wireless communication system is provided. The method may include: transmitting information on transmission times of a plurality of PRS resources included in one or more PRS resource sets; transmitting the plurality of PRS resources based on the information on the transmission times; and receiving at least any one of an ID of a specific PRS resource among the plurality of PRS resources and an ID of a PRS resource set including the specific PRS resource and an ID of a TRP related to the PRS resource set including the specific PRS resource, based on the positioning related information.

In another aspect of the present disclosure, an apparatus configured to operate in a wireless communication system is provided. The apparatus may include: a memory; and one or more processors connected to the memory. The one or more processors may be configured to: transmit information on transmission times of a plurality of PRS resources included in one or more PRS resource sets; transmit the plurality of PRS resources based on the information on the transmission times; and receive at least any one of an ID of a specific PRS resource among the plurality of PRS resources and an ID of a PRS resource set including the specific PRS resource and an ID of a TRP related to the PRS resource set including the specific PRS resource, based on the positioning related information.

In a further aspect of the present disclosure, a processor-readable medium is provided. The processor-readable medium may be configured to store one or more instructions that cause one or more processors to perform a method. The method may include: transmitting information on transmission times of a plurality of PRS resources included in one or more PRS resource sets; transmitting the plurality of PRS resources based on the information on the transmission times; and receiving at least any one of an ID of a specific PRS resource among the plurality of PRS resources and an ID of a PRS resource set including the specific PRS resource and an ID of a TRP related to the PRS resource set including the specific PRS resource, based on the positioning related information.

The above-described aspects of the present disclosure are merely some of the preferred embodiments of the present disclosure, and various embodiments reflecting the technical features of the present disclosure may be derived and understood by those skilled in the art based on the following detailed description of the disclosure.

Advantageous Effects

The embodiments of the present disclosure have the following effects.

According to various embodiments of the present disclosure, a method of transmitting at least any one of an identifier (ID) of a specific positioning reference signal (PRS) resource and an ID of a PRS resource set including the specific PRS resource based on positioning related information in a wireless communication system and apparatus for supporting the same may be provided.

According to various embodiments of the present disclosure, unnecessary reference signal time difference (RSTD) measurements may be excluded in determining the location of a user equipment (UE), thereby improving accuracy and reducing unnecessary reporting overhead.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 7 is a diagram illustrating positioning reference signal (PRS) mapping in a long term evolution (LTE) system to which various embodiments of the present disclosure are applicable.

FIG. 21 is a diagram illustrating discontinuous reception (DRX) operation according to various embodiments of the present disclosure.

BEST MODE

Figure 1:
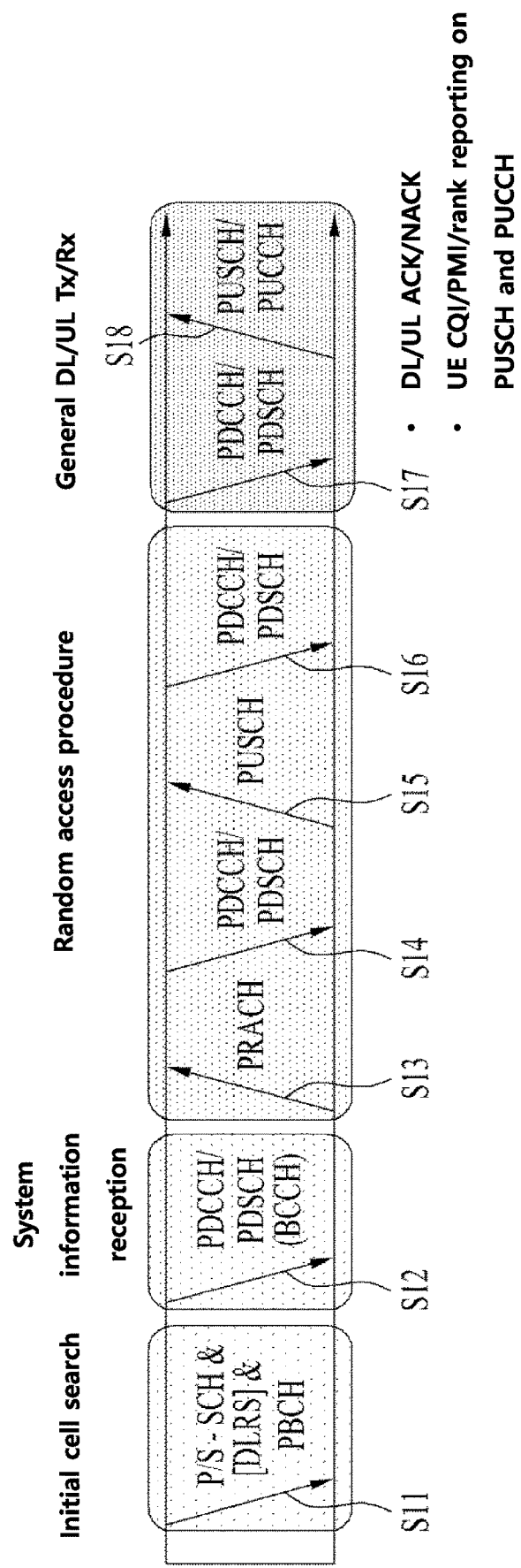
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP fifth-generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

For clarification of description for technical features of the present disclosure, although the embodiments of the present disclosure will be described based on a 3GPP NR system as well as a 3GPP LTE/LTE-A system, the present disclosure may be applied to an IEEE 802.16e/m system, etc.

1. 3GPP System Overview 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

Meanwhile, the random access procedure is performed in two stages, S13 and S15 may be performed as one operation in which the UE performs transmission, and S14 and S16 may be performed as one operation in which the BS performs transmission.

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network

1.2. Radio Frame Structure

Figure 2:
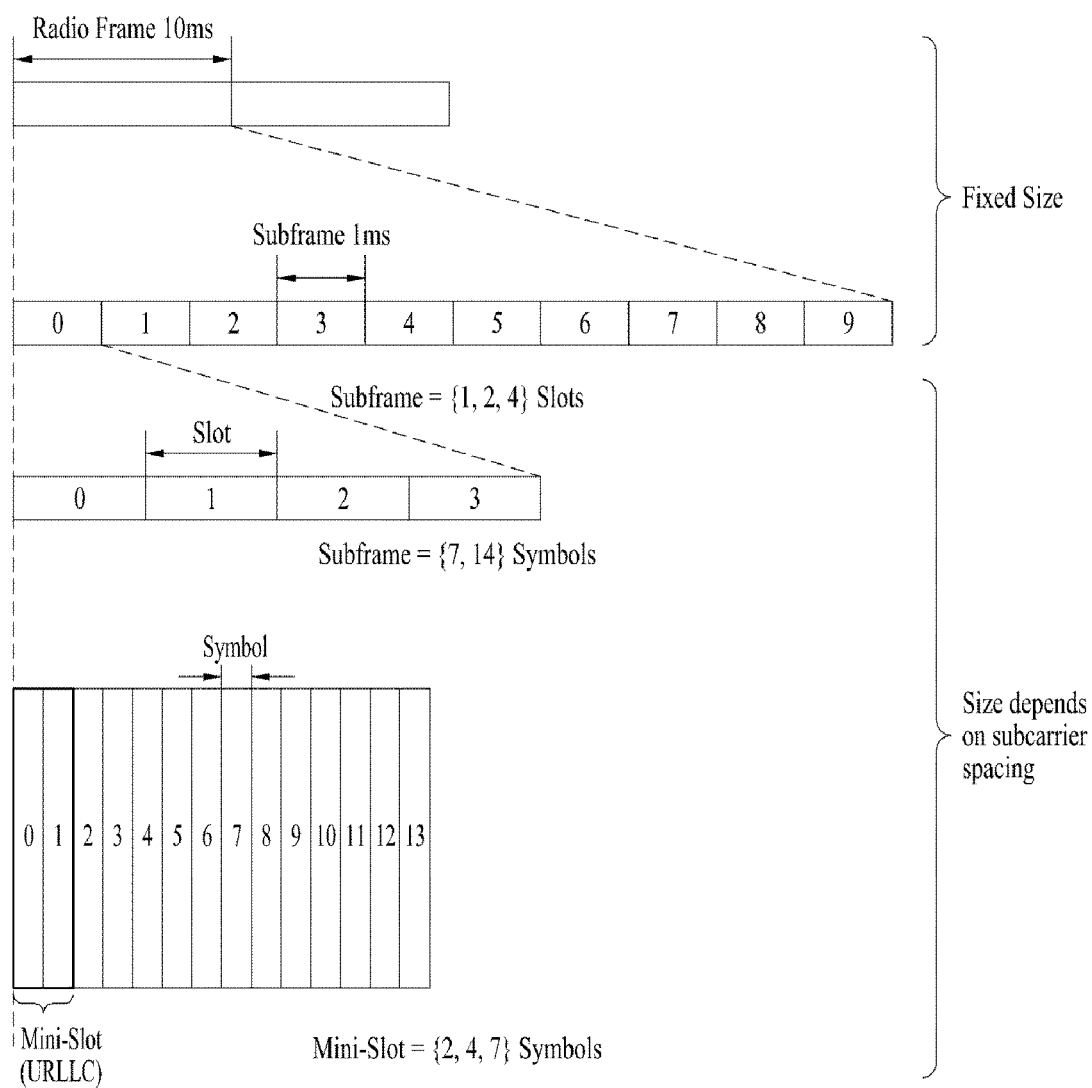
FIG. 2 is a diagram illustrating a radio frame structure of a new radio (NR) system to which various embodiments of the present disclosure are applicable.

FIG. 2 is a diagram illustrating a radio frame structure of the NR system to which various embodiments of the present disclosure are applicable.

The NR system may support multiple numerologies. The numerology is defined by a subcarrier spacing and cyclic prefix (CP) overhead. A plurality of subcarrier spacings may be derived by scaling a basic subcarrier spacing by an integer N (or p). The numerology may be selected independently of the frequency band of a cell although it is assumed that a small subcarrier spacing is not used at a high carrier frequency. In addition, the NR system may support various frame structures based on the multiple numerologies.

Hereinafter, an OFDM numerology and a frame structure, which may be considered in the NR system, will be described. Table 1 shows multiple OFDM numerologies supported in the NR system. The value of p for a bandwidth part and a CP may be obtained by radio resource control (RRC) parameters provided by the BS.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., subcarrier spacings) to support various 5G services. For example, the NR system supports a wide area in conventional cellular bands in a subcarrier spacing of 15 kHz and supports a dense urban environment, low latency, and wide carrier BW in a subcarrier spacing of 30/60 kHz. In a subcarrier spacing of 60 kHz or above, the NR system supports a BW higher than 24.25 GHz to overcome phase noise.

NR frequency bands are defined by two frequency ranges: frequency range 1 (FR1) and frequency range 2 (FR2). FR1 covers sub-6 GHz frequency bands, and FR2 covers frequency bands above 6 GHz, i.e., bands in the millimeter wavelength (mmWave).

Table 2 shows the definitions of the NR frequency ranges.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are defined as multiples of a basic time unit for NR, $T_c = 1/(\Delta f_{max} * N_f)$, where $\Delta f_{max} = 480 * 10^3$ Hz and the value of $N_f$ related to a fast Fourier transform (FFT) size or an inverse fast Fourier transform (IFFT) size is given by $N_f = 4096$. $T_c$ and $T_s$ have the following relationship: $T_s/T_c = 64$, where $T_s$ is an LTE-based time unit and sampling time and is given by $T_s = 1/((15 \text{ kHz})*2048)$. DL and UL transmissions are organized into (radio) frames, each of which has a duration of $T_f = (\Delta f_{max} * N_f/100) * T_c = 10$ ms. Each radio frame includes 10 subframes each having a duration of $T_{sf} = (\Delta f_{max} * N_f/1000) * T_c = 1$ ms. There may be one set of UL frames and one set of DL frames. For a numerology p, slots are numbered by $n^\mu_s \in \{0, \ldots, N^{slot,\mu}_{subframe} - 1\}$ in ascending order within a subframe, and slots are numbered by $n^\mu_{s,f} \in \{0, \ldots, N^{slot,\mu}_{frame} - 1\}$ in ascending order within a radio frame. One slot includes $N^\mu_{symb}$ consecutive OFDM symbols, and $N^\mu_{symb}$ depends on CPs. The start of a slot $n^\mu_s$ in a subframe is aligned in time with the start of an OFDM symbol $n_s * N_{symb}$ in the same subframe.

Table 3 shows the number of symbols in each slot, the number of slots in each frame, and the number of slots in each subframe depending on subcarrier spacings (SCSs) in the case of a normal CP. Table 4 shows the number of symbols in each slot, the number of slots in each frame, and the number of slots in each subframe depending on SCSs in the case of an extended CP.

TABLE 3

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ denotes the number of symbols in a slot, $N^{frame,\mu}_{slot}$ denotes the number of slots in a frame, and $N^{subframe,\mu}_{slot}$ denotes the number of slots in a subframe.

In the NR system applicable to various embodiments of the present disclosure, different OFDM(A) numerologies (e.g., SCS, CP length, etc.) may be configured for a plurality of cells aggregated for one UE. Therefore, the (absolute time) duration of a time resource (e.g., SF, slot, or TTI) including the same number of symbols may differ between the aggregated cells (such a time resource is referred to as a TU for convenience of description).

FIG. 2 shows a case in which p=2 (i.e., an SCS of 60 kHz). Referring to Table 3, one subframe may include four slots. One subframe={1, 2, 4} slots shown in FIG. 2, which is exemplary, and the number of slot(s) included in one subframe may be defined as listed in Table 6 or Table 7.

Further, a mini-slot may include 2, 4 or 7 symbols, fewer symbols than 2, or more symbols than 7.

Figure 3:
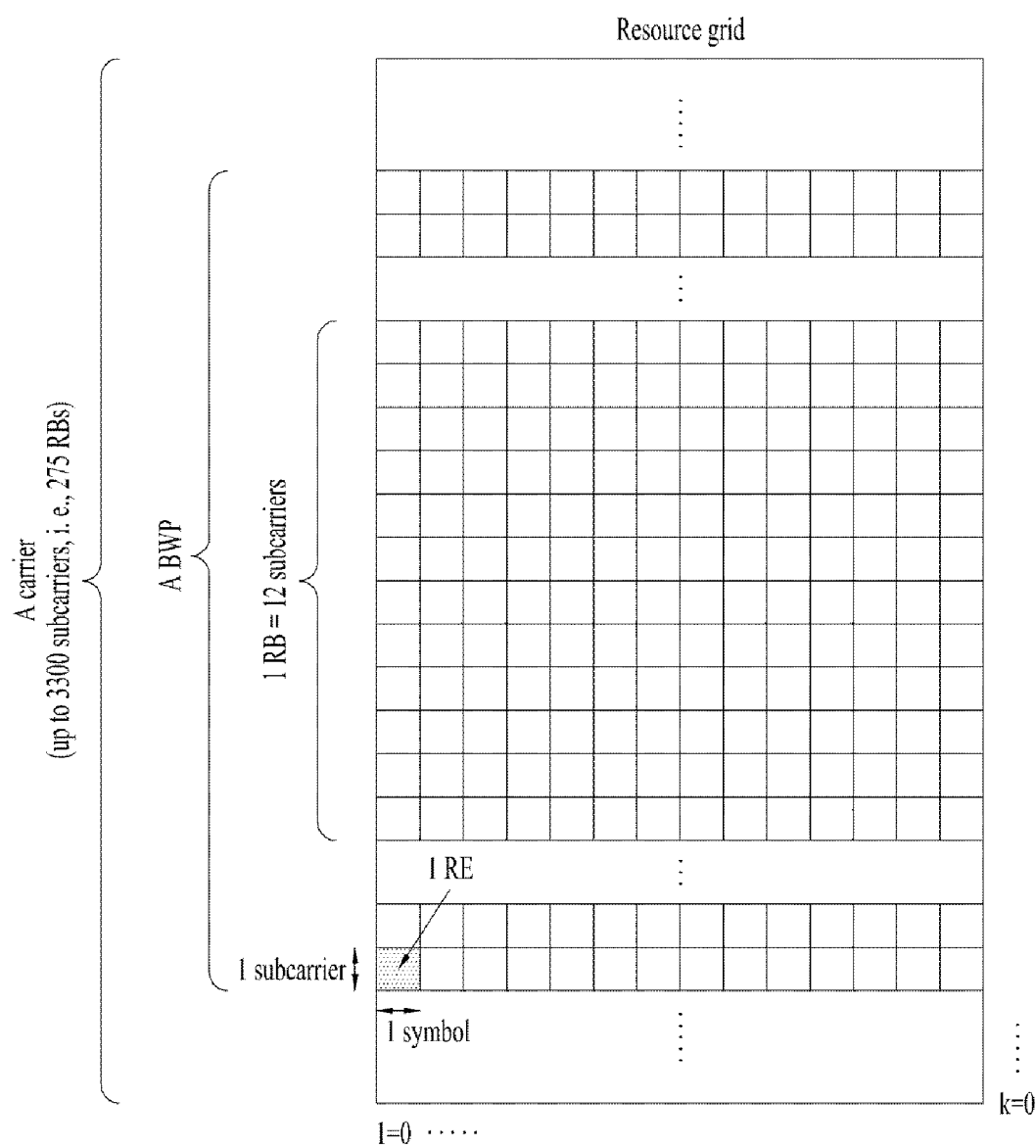
FIG. 3 is a diagram illustrating a slot structure of the NR system to which various embodiments of the present disclosure are applicable.

FIG. 3 is a diagram illustrating a slot structure of the NR system to which various embodiments of the present disclosure are applicable.

Referring FIG. 3, one slot includes a plurality of symbols in the time domain. For example, one slot may include 7 symbols in the normal CP case and include 6 symbols in the extended CP case.

A carrier may include a plurality of subcarriers in the frequency domain. A resource block (RB) may be defined as a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, etc.).

A carrier may include up to N (e.g., 5) BWPs. Data communication may be conducted in an activated BWP, and only one BWP may be activated for one UE. In a resource grid, each element is referred to as a resource element (RE), to which one complex symbol may be mapped.

Figure 4:
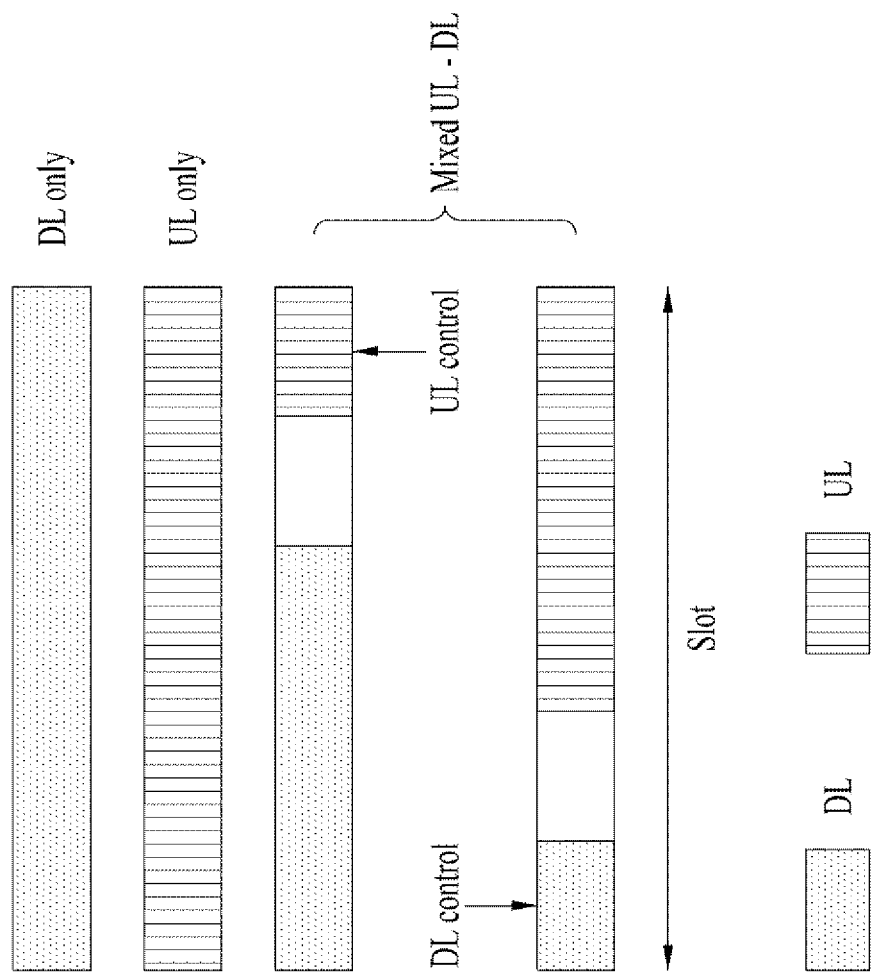
FIG. 4 is a diagram illustrating a self-contained slot structure to which various embodiments of the present disclosure are applicable.

FIG. 4 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of final data transmission.

In this self-contained slot structure, a time gap with a predetermined time duration is required to allow the BS and UE to switch from transmission mode to reception mode and vice versa. To this end, some OFDM symbols at the time of switching from DL to UL may be set to a GP in the self-contained slot structure.

Although it has been described above that the self-contained slot structure includes both DL and UL control regions, these control regions may be selectively included in the self-contained slot structure. In other words, the self-contained slot structure according to various embodiments of the present disclosure may include either the DL control region or UL control region as well as both the DL and UL control regions as illustrated in FIG. 4.

Further, the order of regions in one slot may vary in some embodiments. For example, one slot may be configured in the following order: DL control region/DL data region/UL control region/UL data region or UL control region/UL data region/DL control region/DL data region.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structure 1.3.1. DL Channel Structure

The BS may transmit signals to the UE on DL channels, which will be described below, and the UE may receive the signals from the BS on the DL channels.

1.3.1.1. Physical Downlink Shared Channel (PDSCH)

The PDSCH may carry DL data (e.g., DL-shared channel transport block (DL-SCH TB)) and use a modulation scheme such as quadrature phase shift keying (QPSK), 16-ary quadrature amplitude modulation (16QAM), 64QAM, or 256QAM. A TB may be encoded into a codeword. The PDSCH may carry up to two codewords. Scrambling and modulation mapping may be performed for each codeword, and modulation symbols generated from each codeword may be mapped to one or more layers (layer mapping). Each layer may be mapped to resources together with a demodulation reference signal (DMRS), generated as an OFDM symbol signal, and then transmitted on a corresponding antenna port.

1.3.1.2. Physical Downlink Control Channel (PDCCH)

The PDCCH may carry downlink control information (DCI), for example, DL data scheduling information, UL data scheduling information, and so on. The PUCCH may carry uplink control information (UCI), for example, acknowledgement/negative acknowledgement (ACK/NACK) information for DL data, channel state information (CSI), a scheduling request (SR), and so on.

The PDCCH may carry DCI, and the QPSK modulation scheme is applied thereto. One PDCCH includes 1, 2, 4, 8, or 16 control channel elements (CCEs) depending on aggregation levels (ALs). One CCE includes 6 resource element groups (REGs). One REG is defined as one OFDM symbol and one (P)RB.

The PDCCH may be transmitted in a control resource set (CORESET). The CORESET is defined as a set of REGs with a given numerology (e.g., SCS, CP length, and so on). A plurality of CORESETs for one UE may overlap with each other in the time/frequency domain. The CORESET may be configured by system information (e.g., master information block (MIB)) or by UE-specific higher layer signaling (RRC signaling). Specifically, the number of RBs and the number of symbols (up to 3 symbols) included in the CORESET may be configured by higher layer signaling.

For each CORESET, the precoder granularity in the frequency domain may be set to one of the followings by higher layer signaling:

sameAsREG-bundle: The precoder granularity is equal to an REG bundle size in the frequency domain.

allContiguousRBs: The precoder granularity is equal to the number of contiguous RBs in the frequency domain within the CORESET.

The REGs of the CORESET are numbered in a time-first mapping manner. That is, the REGs are sequentially numbered in ascending order, starting from 0 for the first OFDM symbol of the lowest-numbered RB in the CORESET.

CCE-to-REG mapping types may be classified into an interleaved CCE-to-REG mapping type or a non-interleaved CCE-to-REG mapping type.

The UE may obtain DCI transmitted over a PDCCH by decoding (blind decoding) a set of PDCCH candidates. The set of PDCCH candidates decoded by the UE is defined as a PDCCH search space set. A search space set may be a common search space (CSS) or a UE-specific search space (USS). The UE may obtain DCI by monitoring PDCCH candidates in one or more search space sets configured by an MIB or higher layer signaling. Each CORESET configuration may be associated with one or more search space sets, and each search space set may be associated with one CORESET configuration. One search space set may be determined based on the following parameters.

controlResourceSetId: A set of control resources related to the search space set.

monitoringSlotPeriodicityAndOffset: A PDCCH monitoring periodicity (in a unit of slot) and a PDCCH monitoring offset (in a unit of slot).

monitoringSymbolsWithinSlot: A PDCCH monitoring pattern (e.g., first symbol(s) in the CORESET) in a PDCCH monitoring slot.

nrofCandidates: The number of PDCCH candidates for each AL={1, 2, 4, 8, 16} (one of 0, 1, 2, 3, 4, 5, 6, and 8).

Table 5 shows features of each search space type.

TABLE 5

| Type | Search Space | RNTI | Use Case |
|---|---|---|---|
| Type0-PDCCH | Common | SI-RNTI on a primary cell | SIB Decoding |

TABLE 5-continued

| Type | Search Space | RNTI | Use Case |
|---|---|---|---|
| Type0A-PDCCH | Common | SI-RNTI on primary cell | SIB Decoding |
| Type1-PDCCH | Common | RA-RNTI or TC-RNTI on a primary cell | Msg2, Msg4 decoding in RACH |
| Type2-PDDCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RSTI, or MCS-C-RNTI, or CS-RNTI(s) | User specific PDSCH decoding |

Table 6 shows DCI formats transmitted over the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbols(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 20 may be used to transmit dynamic slot format information (e.g., dynamic slot format indicator (SFI)) to the UE, and DCI format 21 may be used to transmit DL preemption information to the UE. DCI format 2_0 and/or DCI format 2_1 may be transmitted to UEs in a group over a group common PDCCH (GC-PDCCH), which is a PDCCH directed to a group of UEs.

1.3.2. UL Channel Structure

The UE may transmit signals to the BS on UL channels, which will be below, and the BS may receive the signals from the UE on the UL channels.

1.3.2.1. Physical Uplink Shared Channel (PUSCH)

The PUSCH may carry UL data (e.g., UL-shared channel transport block (UL-SCH TB)) and/or UCI. The PUSCH may be transmitted based on a cyclic prefix-orthogonal frequency division multiplexing (CP-OFDM) waveform or a discrete Fourier transform-spread-orthogonal division multiplexing (DFT-s-OFDM) waveform. When the PUSCH is transmitted based on the DFT-s-OFDM waveform, the UE may transmit the PUSCH by applying transform precoding. For example, when no transform precoding is allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. The PUSCH transmission may be scheduled dynamically by a UL grant in DCI or semi-statically by higher layer signaling (e.g., RRC signaling) (and/or Layer 1 (L1) signaling (e.g., PDCCH)) (configured grant). Both codebook based PUSCH transmission and non-codebook based PUSCH transmission may be allowed.

1.3.2.2. Physical Uplink Control Channel (PUCCH)

The PUCCH may carry UCI, a HARQ-ACK, and/or an SR. Depending on the transmission duration of the PUCCH, the PUCCH may be classified into a short PUCCH and a long PUCCH. Table 7 shows PUCCH formats.

TABLE 7

| PUCCH format | Length in OFDM symbols $N^{PUCCH}_{symb}$ | Number of bits | Usage | Etc. |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 may carry UCI of up to 2 bits and be mapped in a sequence-based manner for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 on a PUCCH resource for a corresponding SR configuration.

PUCCH format 1 may carry UCI of up to 2 bits. Modulation symbols may be spread by an orthogonal cover code (OCC) (which is configured differently depending on the presence of frequency hopping) in the time domain. The DMRS may be transmitted in a symbol in which no modulation symbols are transmitted (i.e., transmitted in time division multiplexing (TDM)).

PUCCH format 2 may carry UCI of more than 2 bits. Modulation symbols may be transmitted in frequency division multiplexing (FDM) with the DMRS. The DMRS may be located in symbols #1, #4, #7, and #10 of a given RB with a density of ⅓. A pseudo noise (PN) sequence may be used for a DMRS sequence. For 2-symbol PUCCH format 2, frequency hopping may be activated.

PUCCH format 3 may not support UE multiplexing in the same PRBs and carry UCI of more than 2 bits. In other words, PUCCH resources of PUCCH format 3 may include no OCC. Modulation symbols may be transmitted in TDM with the DMRS.

PUCCH format 4 may support multiplexing of up to four UEs in the same PRBs and carry UCI of more than 2 bits. In other words, PUCCH resources of PUCCH format 4 may include an OCC. Modulation symbols may be transmitted in TDM with the DMRS.

1.4. Cell Search

Figure 5:
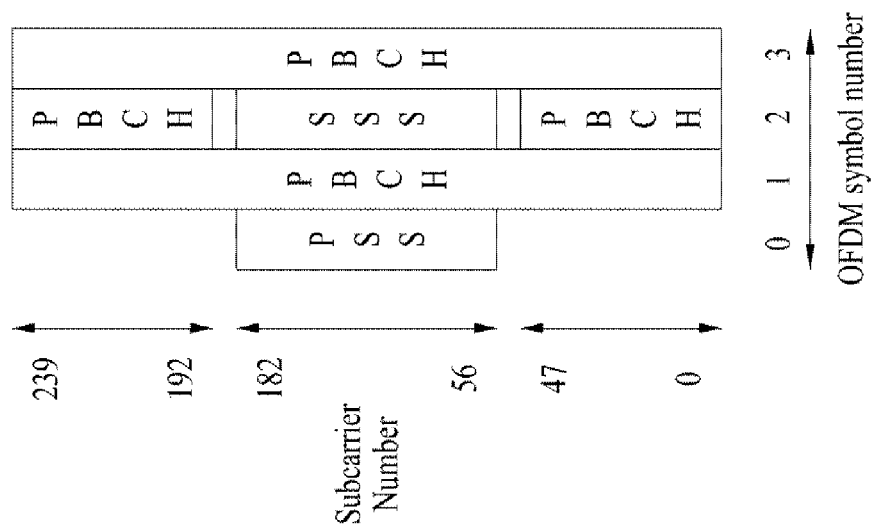
FIG. 5 is a diagram illustrating a synchronization signal block (SSB) structure to which various embodiments of the present disclosure are applicable.

FIG. 5 is a diagram illustrating a synchronization signal block (SSB) structure to which various embodiments of the present disclosure are applicable.

The UE may perform cell search, system information acquisition, beam alignment for initial access, DL measurement, etc. based on an SSB. The term SSB is interchangeably used with a synchronization signal/physical broadcast channel (SS/PBCH) block.

Referring to FIG. 5, an SSB includes a primary synchronization signal (PSS), a secondary synchronization signal (SSS), and a PBCH. The SSB includes four consecutive OFDM symbols, which carry the PSS, PBCH, SSS/PBCH, and PBCH, respectively. Each of the PSS and the SSS includes one OFDM symbol and 127 subcarriers, and the PBCH includes three OFDM symbols and 576 subcarriers. Polar coding and QPSK are applied to the PBCH. The PBCH includes data and DMRS REs in each OFDM symbol. There are three DMRS REs for each RB, and three data REs are present between DMRS REs.

Cell search is a process by which the UE obtains time/frequency synchronization with a cell and detects the cell ID (e.g., physical layer cell ID (PCID)) of the cell. The PSS is used to detect a cell ID in a cell ID group, and the SSS is used to detect a cell ID group. The PBCH is used to detect an SSB (time) index and a half-frame.

The cell search procedure of the UE may be summarized in Table 8 below.

TABLE 8

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACH configuration |

There may be 336 cell ID groups, and each cell ID group may have three cell IDs. There may be 1008 cell IDs in total. Information about a cell ID group to which the cell ID of a cell belongs may be provided/obtained by/from the SSS of the cell, and information about the cell ID among 336 cells in the cell ID may be provided/obtained by/from the PSS.

Figure 6:
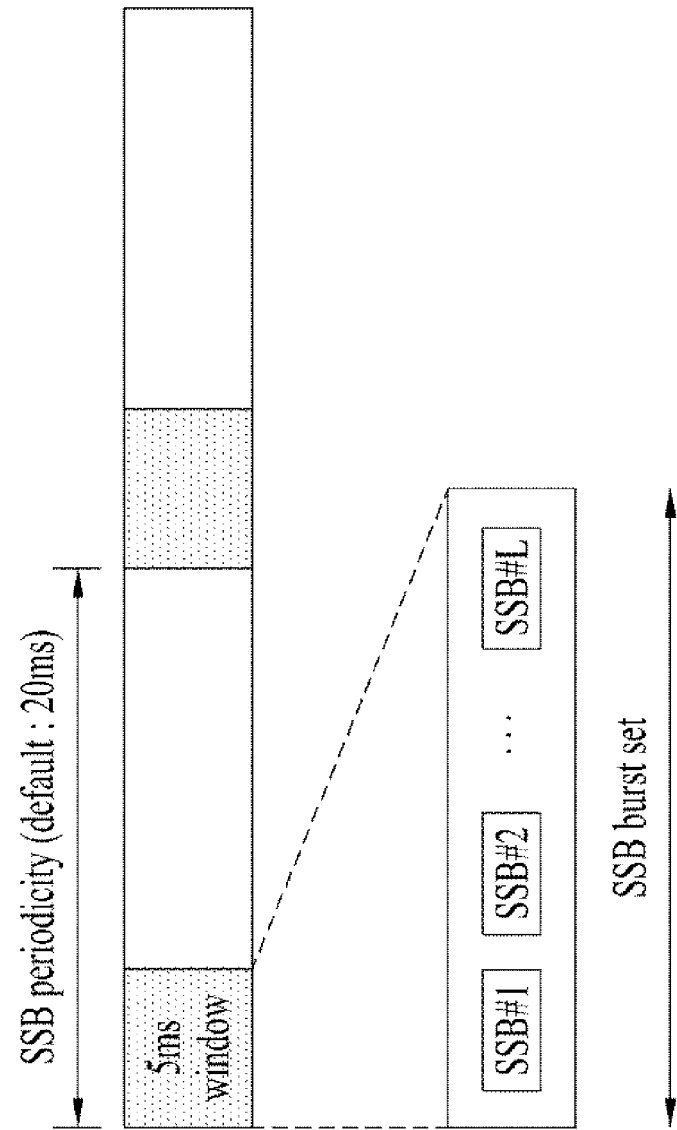
FIG. 6 is a diagram illustrating an SSB transmission method to which various embodiments of the present disclosure are applicable.

FIG. 6 is a diagram illustrating an SSB transmission method to which various embodiments of the present disclosure are applicable.

Referring to FIG. 6, an SSB is periodically transmitted with the SSB periodicity. The basic SSB periodicity assumed by the UE in initial cell search is defined as 20 ms. After cell access, the SSB periodicity may be set to one of {5 ms, 10 ms, 20 ms, 40 ms, 80 ms, and 160 ms} by the network (e.g., BS). An SSB burst set may be configured at the beginning of the SSB periodicity. The SSB burst set may be set to a time window of 5 ms (i.e., half-frame), and the SSB may be repeatedly transmitted up to L times within the SS burst set. The maximum number of SSB transmissions L may be given depending carrier frequency bands as follows. One slot includes up to two SSBs.

For frequency range up to 3 GHz, L=4
For frequency range from 3 to 6 GHz, L=8
For frequency range from 6 to 52.6 GHz, L=64

The time position of a candidate SSB in the SS burst set may be defined depending on the SCS as follows. The time position of the candidate SSB is indexed from (SSB indices) 0 to L−1 in temporal order within the SSB burst set (i.e., half-frame).

Case A (15 kHz SCS): The index of the first symbol of the candidate SSB is given by {2, 8}+14*n where n=0 or 1 for a carrier frequency below 3 GHz, and n=0, 1, 2, or 3 for a carrier frequency of 3 to 6 GHz.

Case B (30 kHz SCS): The index of the first symbol of the candidate SSB is given by {4, 8, 16, 20}+28*n where n=0 for a carrier frequency below 3 GHz, and n=0 or 1 for a carrier frequency of 3 to 6 GHz.

Case C (30 kHz SCS): The index of the first symbol of the candidate SSB is given by {2, 8}+14*n where n=0 or 1 for a carrier frequency below 3 GHz, and n=0, 1, 2, or 3 for a carrier frequency of 3 to 6 GHz.

Case D (120 kHz SCS): The index of the first symbol of the candidate SSB is given by {4, 8, 16, 20}+28*n where n=0, 1, 2, 3, 5, 6, 7, 8, 10, 11, 12, 13, 15, 16, 17, or 18 for a carrier frequency above 6 GHz.

Case E (240 kHz SCS): The index of the first symbol of the candidate SSB is given by {8, 12, 16, 20, 32, 36, 40, 44}+56*n where n=0, 1, 2, 3, 5, 6, 7, or 8 for a carrier frequency above 6 GHz.

2. Positioning

Positioning may refer to determination of the geographical position and/or velocity of the UE based on measurement of radio signals. Location information may be requested by a client (e.g., application) related to the UE and reported to the client. The location information may also be requested by a client existing in or connected to a core network. The location information may be reported in standard formats such as cell-based or geographical coordinates. In this case, estimated errors about the position and velocity of the UE and/or a positioning method used for positioning may be reported together.

For such positioning, a positioning reference signal (PRS) may be used. The PRS is a reference signal used to estimate the position of the UE 2.1. PRS in LTE System In the LTE system, the PRS may be transmitted only in a DL subframe configured for PRS transmission (hereinafter, positioning subframe). If both a multimedia broadcast single frequency network (MBSFN) subframe and a non-MBSFN subframe are set to the positioning subframe, OFDM symbols of the MBSFN subframe should have the same CP as subframe #0. If the positioning subframe includes only the MBSFN subframe within a cell, OFDM symbols configured for the PRS in the MBSFN subframe may have the extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 2N_{RB}^{max,DL} - 1$$

In Equation 1, $n_s$ denotes a slot number in a radio frame, and l denotes an OFDM symbol number in a slot. $N_{RB}^{max,DL}$ denotes the largest value among DL bandwidth configurations and is represented as an integer multiple of $N_{SC}^{RB}$. $N_{SC}^{RB}$ denotes the size of an RB in the frequency domain, for example, the RB may include 12 subcarriers.

In addition, c(i) denotes a pseudo-random sequence and may be initialized by Equation 2 below.

$$c_{init} = 2^{28} \cdot \lfloor N_{ID}^{PRS}/512 \rfloor + 2^{10} \cdot (7 \cdot (n_s+1)+l+1) \cdot (2 \cdot (N_{ID}^{PRS} \bmod 512)+1)+2 \cdot (N_{ID}^{PRS} \bmod 512)+N_{CP} \quad \text{[Equation 2]}$$

If there are no configurations from higher layers, $N_{ID}^{PRS}$ is equal to $N_{ID}^{cell}$, and $N_{CP}$ is 1 for the normal CP and 0 for the extended CP.

FIG. 7 is a diagram illustrating PRS mapping in the LTE system to which various embodiments of the present disclosure are applicable.

Referring to FIG. 7, the PRS may be transmitted through antenna port 6. FIG. 7(a) illustrates PRS mapping in the normal CP and FIG. 7(b) illustrates PRS mapping in the extended CP.

In the LTE system, the PRS may be transmitted in consecutive subframes grouped for positioning. The subframes grouped for positioning may be referred to as a positioning occasion. The positioning occasion may include 1, 2, 4 or 6 subframes. The positioning occasion may occur periodically at a periodicity of 160, 320, 640 or 1280 subframes. A cell-specific subframe offset value may be defined to indicate the starting subframe of PRS transmission. The offset value and periodicity of the positioning occasion for PRS transmission may be derived from PRS configuration indices as shown in Table 9 below.

TABLE 9

| PRS configuration Index ($I_{PRS}$) | PRS periodicity (subframes) | PRS subframe offset (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2174 | 40 | $I_{PRS}$-2435 |
| 2475-2554 | 80 | $I_{PRS}$-2475 |
| 2555-4096 | Reserved | |

PRSs included in positioning occasions may be transmitted with constant power. In this case, a zero-power PRS may be transmitted on a specific positioning occasion, which is referred to as PRS muting. For example, if a PRS transmitted in a serving cell is muted, the UE may easily detect PRSs from neighboring cells.

The PRS muting configuration of a cell may be defined by a periodic muting sequence consisting of 2, 4, 8 or 16 positioning occasions. That is, the periodic muting sequence may include 2, 4, 8, or 16 bits depending on the positioning occasion related to the PRS muting configuration, and each bit may have a value 0 or 1. For example, PRS muting may be performed in a positioning occasion with the bit value of 0.

Since the positioning subframe is designed as a low-interference subframe, no data is transmitted in the positioning subframe. Therefore, the PRS is not subjected to interference from data transmission although interfered by PRSs from other cells.

2.2. UE Positioning Architecture in NR System

Figure 8:
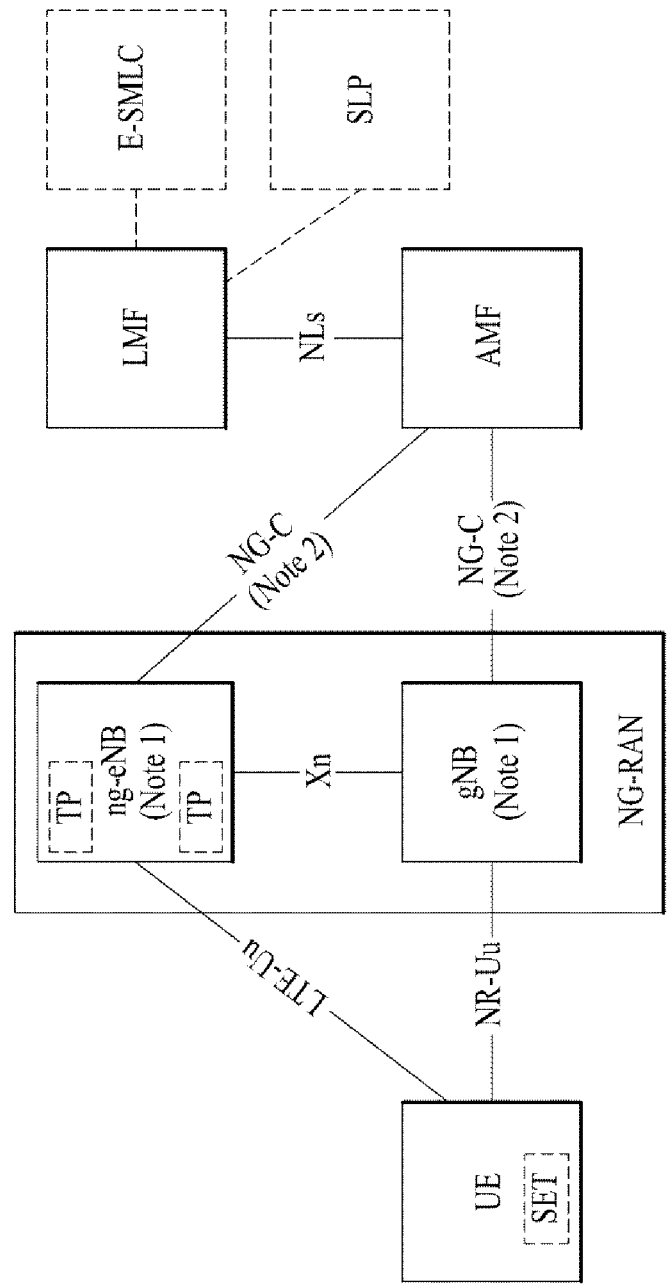
FIG. 8 is a diagram illustrating the architecture of a user equipment (UE) positioning system to which various embodiments of the present disclosure are applicable.

FIG. 8 is a diagram illustrating the architecture of a UE positioning system to which various embodiments of the present disclosure are applicable.

Referring to FIG. 8, a core access and mobility management function (AMF) may receive a location service request related to a specific target UE from another entity such as a gateway mobile location center (GMLC), or the AMF may autonomously determine to provide location services on behalf of the specific target UE. Then, the AMF transmits the location service request to a location management function (LMF). Upon receiving the location service request, the LMF may process the location service request and then return processing results including the estimated position of the UE to the AMF. When the AMF receives the location service request from the other entity such as the GMLC, the AMF may transmit the processing results received from the LMF to the other entity.

A new-generation evolved-NB (ng-eNB) and a gNB are network elements of a NG-RAN capable of providing measurement results for positioning. The ng-eNB and gNB may measure radio signals for a target UE and transmit measurement results to the LMF. The ng-eNB may control several transmission points (TPs) such as remote radio heads or PRS-only TPs for support of a PRS-based beacon system for E-UTRA.

The LMF may be connected to an enhanced serving mobile location center (E-SMLC) which allows the LMF to access an evolved UMTS terrestrial radio access network (E-UTRAN). For example, the E-SMLC may allow the LMF to support observed time difference of arrival (OT-DOA), which is one of positioning methods of the E-UTRAN, based on DL measurements obtained by the target UE from signals transmitted by eNBs and/or PRS-only TPs in the E-UTRAN.

The LMF may be connected to a Secure User Plane Location (SUPL) location platform (SLP). The LMF may support and manage different location services for target UEs. The LMF may interact with a serving ng-eNB or a serving gNB for a target UE to obtain positioning for the UE. For positioning of the target UE, the LMF may determine positioning methods based on location service (LCS) client types, quality of service (QoS) requirements, UE positioning capabilities, gNB positioning capabilities, and ng-eNB positioning capabilities, and then apply these positioning methods to the serving gNB and/or serving ng-eNB. The LMF may determine additional information such as the estimated position and velocity of the target UE and accuracy thereof. The SLP is an SUPL entity responsible for positioning over a user plane.

The UE may measure the position thereof based on DL RSs transmitted from the NG-RAN and E-UTRAN. The DL RSs transmitted from the NG-RAN and E-UTRAN to the UE may include a SS/PBCH block, a channel state information reference signal (CSI-RS), and/or a PRS. Which DL RS is used to measure the position of the UE may be determined according to the configuration of the LMF/E-SMLC/ng-eNB/E-UTRAN. The position of the UE may be measured in an RAT-independent manner, that is, by using a global navigation satellite system (GNSS), a terrestrial beacon system (TBS), a WLAN access point, a Bluetooth beacon, and a sensor (e.g., barometric sensor) installed in the UE. The UE may also include an LCS application or access the LCS application through communication with the network connected to the UE or through another application installed in the UE. The LCS application may include measurement and calculation functions required to determine the position of the UE. For example, the UE may include an independent positioning function such as a global positioning system (GPS) and thus report the position of the UE independent of NG-RAN transmission. Such independent positioning information may be used as assistance information for positioning information obtained from the network.

2.3. Operation for UE Positioning

Figure 9:
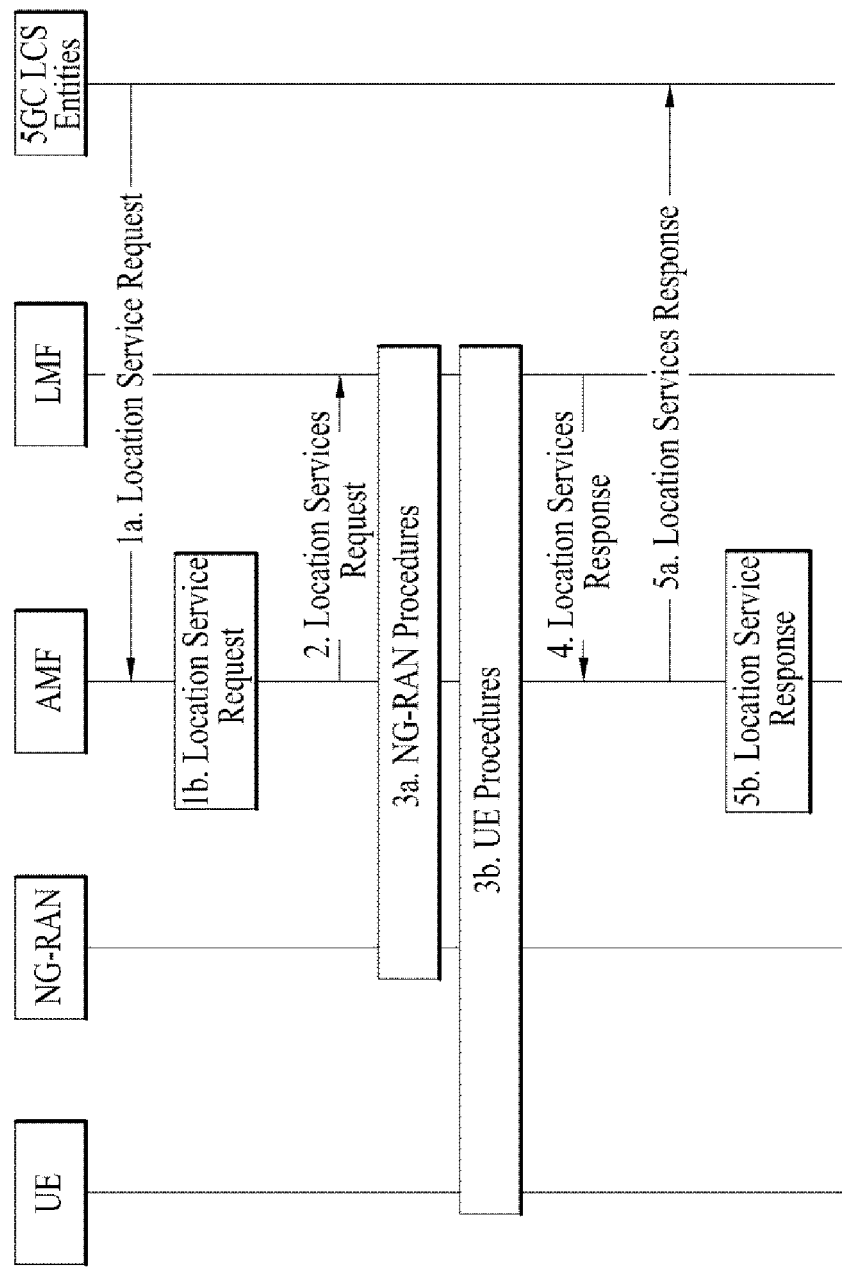
FIG. 9 is a diagram illustrating a UE positioning process to which various embodiments of the present disclosure are applicable.

FIG. 9 is a diagram illustrating a UE positioning process to which various embodiments of the present disclosure are applicable.

When the AMF receives a location service request when the UE is in a connection management (CM)-IDLE state, the AMF may perform a network triggered service request to establish a signaling connection with the UE and assign a specific serving gNB or ng-eNB. This operation is omitted in FIG. 9. In other words, it may be assumed in FIG. 9 that the UE is in connected mode. However, the signaling connection may be released by the NG-RAN as a result of signalling and data inactivity while positioning is still ongoing.

Hereinafter, how the network operates for UE positioning will be described with reference to FIG. 9. In step 1a, a 5GC entity such as the GMLC may request location services to measure the position of a target UE to the serving AMF. In step 1b, even when the GMLC requests no location services, the serving AMF may determine the necessity for location services to measure the position of the target UE. For example, the serving AMF may autonomously determine the necessity for location services to measure the position of the target UE for an emergency call.

In step 2, the AMF may transfer the location service request to the LMF. In step 3a, the LMF may initiate location procedures with the serving ng-eNB or serving gNB to obtain positioning data or secondary positioning data. For example, the LMF may send a request for location related information about one or more UEs to the NG-RAN and indicate the type of required location information and associated QoS. Then, the NG-RAN may transfer the location related information to the LMF in response to the request. In this case, if the positioning method according to the request is an enhanced cell ID (E-CID) method, the NG-RAN may transfer additional location related information to the LMF in one or more NR positioning protocol A (NRPPa) messages. Here, the location related information may mean actual location estimation information and all values used for positioning such as radio measurements or location measurements. In step 3a, an NRPPa may be used, and it will be described later.

In step 3b, the LMF may initiate location procedures with the UE for DL positioning. For example, the LMF may transmit location assistance data to the UE or obtain location estimates or measurements. For example, a capability information transfer procedure may be performed in step 3b. Specifically, the LMF may send a request for capability information to the UE, and the UE may transmit the capability information to the LMF. The capability information may include information about a positioning method supported by the LFM or the UE, information about various aspects of a specific positioning method such as various types of assistance data for an assisted-GNSS (A-GNSS), and information about common features, which are not limited to any one positioning method, such as ability to handle multiple LPP transactions. In some cases, the UE may provide the capability information to the LMF even when the LMF does not request the UE to transmit the capability information.

As another example, a location assistance data transfer procedure may be performed in step 3b. Specifically, the UE may send a request for location assistance data to the LMF and indicate specific required assistance data to the LMF. Then, the LMF may transmit the corresponding location assistance data to the UE and also transmit additional assistance data to the UE in one or more additional LTE positioning protocol (LPP) messages. The location assistance data delivered from the LMF to the UE may be transmitted in a unicast manner. In some cases, the LMF may transmit the location assistance data and/or the additional assistance data to the UE when the UE does not request the LMF to transmit the assistance data.

As another example, a location information transfer procedure may be performed in step 3b. Specifically, the LMF may send a request for location related information about the UE to the UE and indicate the type of required location information and associated QoS. Then, the UE may transmit the location related information to the LMF in response to the request. In this case, the UE may transmit additional location related information to the LMF in one or more LPP messages. Herein, the location related information may mean actual location estimation information and all values used for positioning such as radio measurements or location measurements. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF when there is no request from the LMF.

The procedures performed in step 3b may be independent from each other or may be performed continuously. In general, step 3b may be performed in the following order: capability information transfer procedure, location assistance data transfer procedure, and location information transfer procedure. However, step 3b is not limited thereto. In other words, step 3b may not need to be performed in specific order to improve flexibility in positioning. For example, the UE may request location assistance data at any time to perform a positioning request, which has been requested by the LMF. In addition, if the location information delivered by the UE does not satisfy the required QoS, the LMF may request the location information such as location measurements or estimates at any time. Similarly, when the UE does not perform positioning measurement, the UE may transmit capability information to the LMF at any time.

In step 3b, when there are error(s) in information or requests exchanged between the LMF and UE, an error message may be transmitted and received. In addition, an abort message may be exchanged to abort positioning.

The LPP protocol may be used in step 3b, and it will be described later.

Step 3b may be performed additionally after step 3a but may be performed instead of step 3a.

In step 4, the LMF may provide a location service response to the AMF. The location service response may include information on whether UE positioning is successful and include the location estimate of the UE. If the procedure of FIG. 9 is initiated by step 1a, the AMF may transfer the location service response to the 5GC entity such as the GMLC. If the procedure of FIG. 9 is initiated by step 1b, the AMF may use the location service response to provide location services related to the emergency call.

2.4. Protocol for Positioning 2.4.1. LTE Positioning Protocol (LPP)

Figure 10:
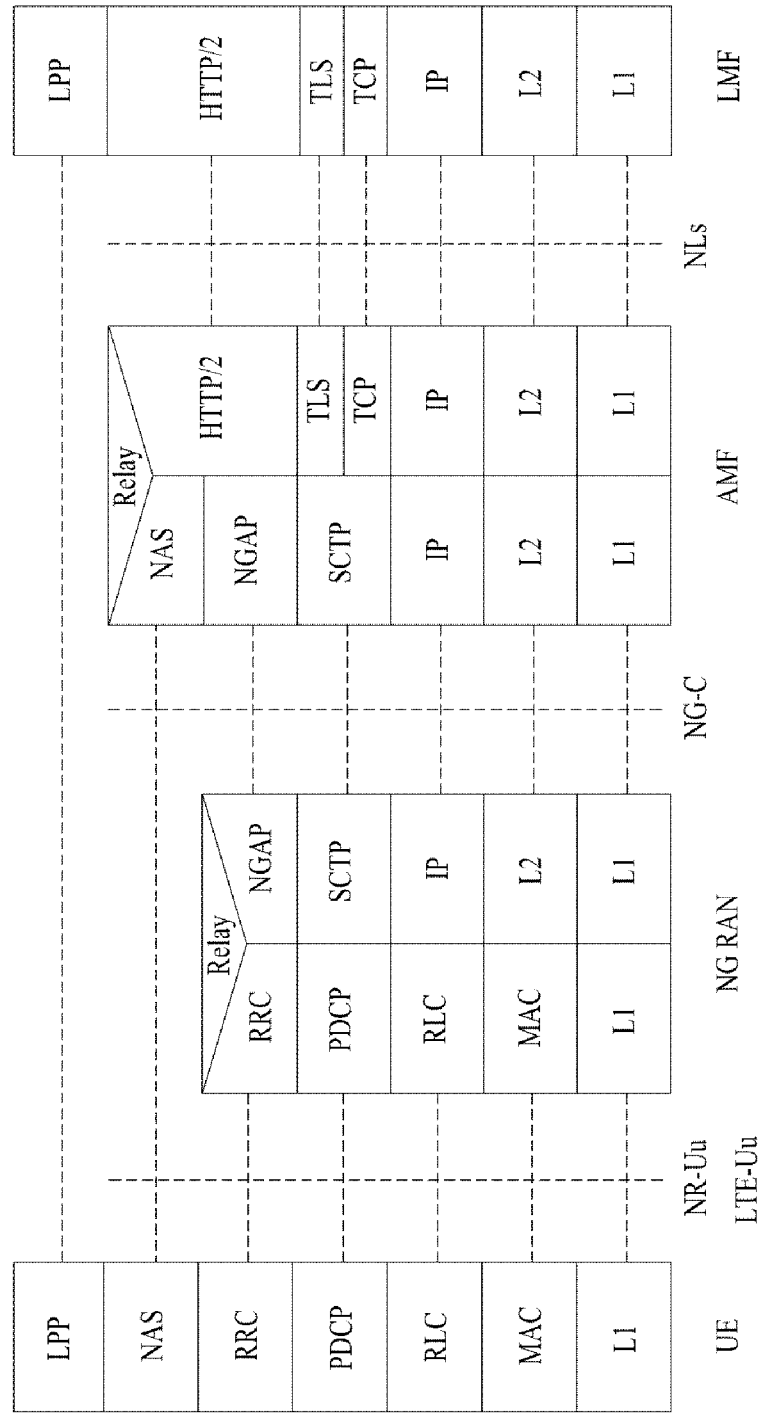
FIG. 10 is a diagram illustrating a protocol layer for supporting LTE positioning protocol (LPP) message transmission to which various embodiments of the present disclosure are applicable.

FIG. 10 is a diagram illustrating a protocol layer for supporting LPP message transmission to which various embodiments of the present disclosure are applicable. An LPP protocol data unit (PDU) may be transmitted in a non-access stratum (NAS) PDU between the AMF and the UE.

Referring to FIG. 10, the LPP may be terminated between a target device (e.g., a UE in a control plane or an SUPL enabled terminal (SET) in a user plane) and a location server (e.g., an LMF in the control plane or an SLP in the user plane). LPP messages may be transmitted in the form of a transparent PDU over an intermediate network interface based on appropriate protocols, such NGAP over an NG-C interface and NAS/RRC over LTE-Uu and NR-Uu interfaces. The LPP may support various positioning methods for positioning in NR and LTE.

For example, the target device may exchange capability information, assistance data for positioning, and/or location information with the location server based on the LPP. The target device and location server may exchange error information and/or exchange the termination of an LPP procedure in LPP messages.

2.4.2. NR Positioning Protocol A (NRPPa)

Figure 11:
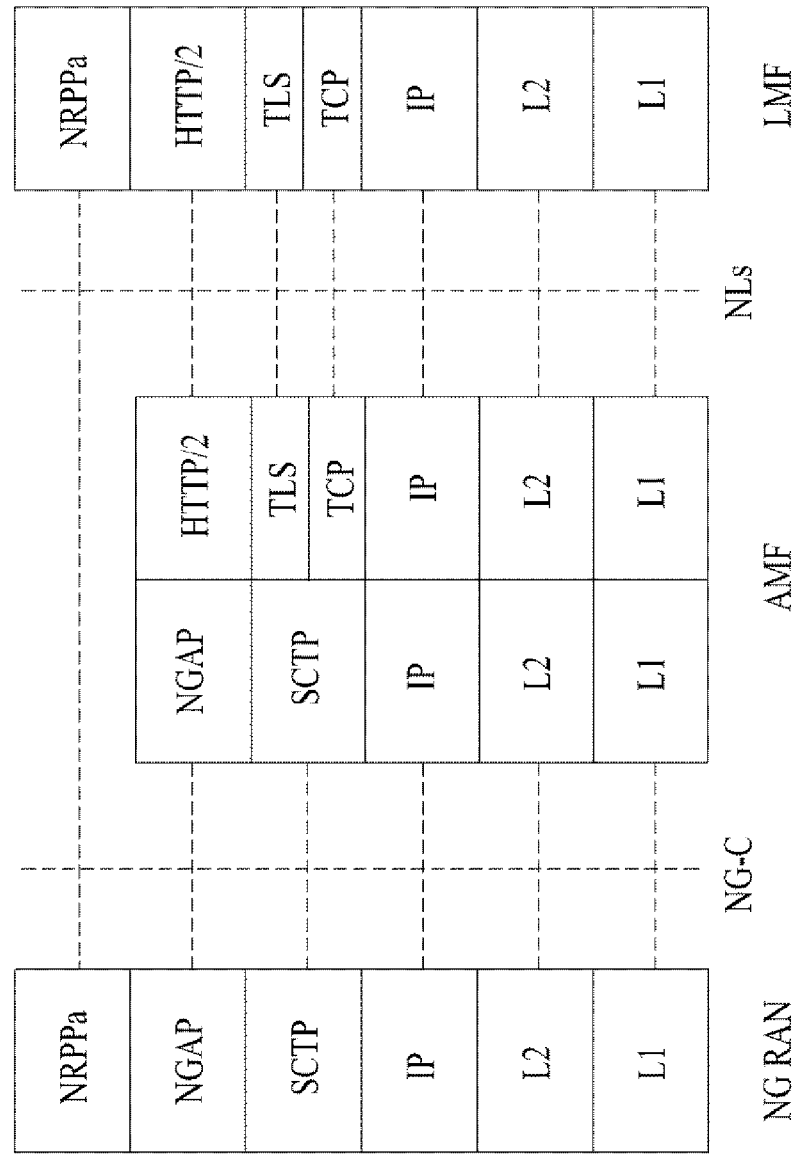
FIG. 11 is a diagram illustrating a protocol layer for supporting NR positioning protocol A (NRPPa) protocol data unit (PDU) transmission to which various embodiments of the present disclosure are applicable.

FIG. 11 is a diagram illustrating a protocol layer for supporting NRPPa PDU transmission to which various embodiments of the present disclosure are applicable.

The NRPPa may be used to exchange information between an NG-RAN node and the LMF. Specifically, the NRPPa may exchange an E-CID for measurement transmitted from the ng-eNB to the LMF, data for support of OTDOA positioning, a cell ID and a cell location ID for NR cell-ID positioning. The AMF may route NRPPa PDUs based on the routing ID of a related LMF over an NG-C interface without information about related NRPPa transactions.

An NRPPa procedure for location and data collection may be divided into two types. The first type is a UE-associated procedure for transmitting information about a specific UE (e.g., location measurement information), and the second type is a non-UE-associated procedure for transmitting information applicable to the NG-RAN node and associated TPs (e.g., gNB/ng-eNB/TP timing information). The two procedures may be supported independently or simultaneously.

2.5. Positioning Measurement Method

The NG-RAN may support various positioning methods such as GNSS, OTDOA, E-CID, barometric sensor positioning, WLAN positioning, Bluetooth positioning, TBS, uplink time difference of arrival (UTDOA), and so on. Although any one of the positioning methods may be used for UE positioning, two or more positioning methods may be used for the UE positioning.

2.5.1. OTDOA (Observed Time Difference Of Arrival)

Figure 12:
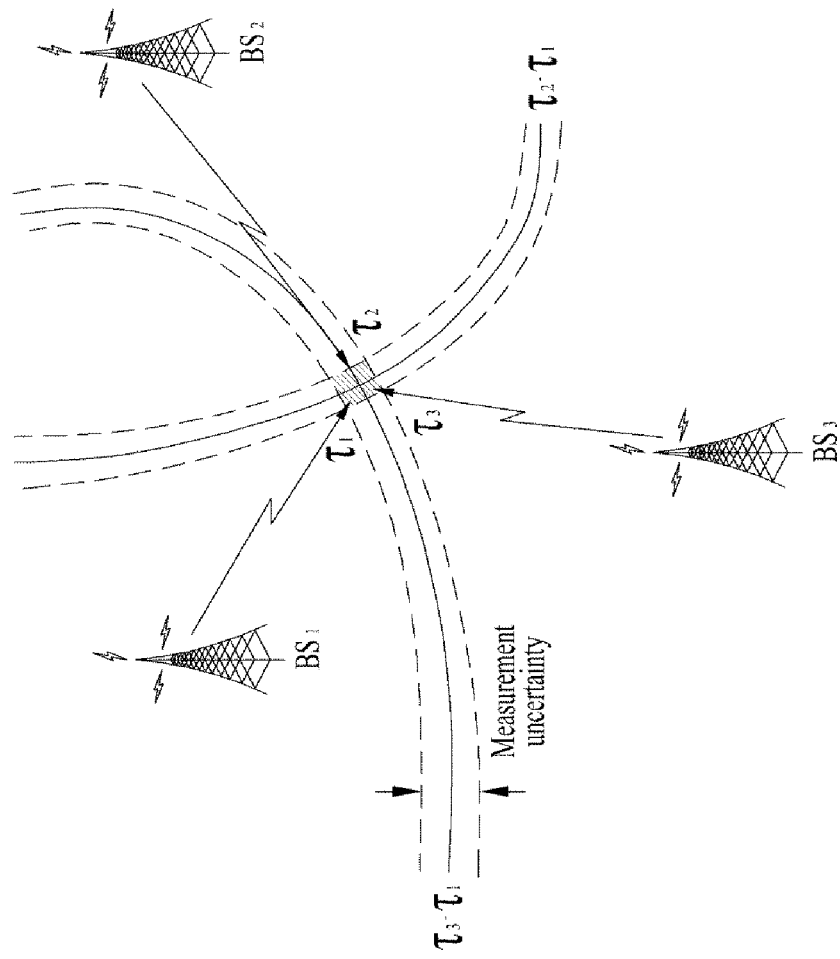
FIG. 12 is a diagram illustrating an observed time difference of arrival (OTDOA) positioning method to which various embodiments of the present disclosure are applicable.

FIG. 12 is a diagram illustrating an OTDOA positioning method to which various embodiments of the present disclosure are applicable.

The OTDOA positioning method uses measurement timings of DL signals received by the UE from multiple TPs including the eNB, ng-eNB, and PRS-only TP. The UE measures the timings of received DL signals based on location assistance data received from the location server. The position of the UE may be determined based on the measurement results and the geographical coordinates of neighboring TPs.

When the UE is connected to the gNB, the UE may request a measurement gap for OTDOA measurement from a TP. If the UE does not recognize the SFN for at least one TP in OTDOA assistance data, the UE may use an autonomous gap to obtain the SFN of an OTDOA reference cell before requesting a measurement gap for RSTD measurement.

Herein, the RSTD may be defined based on the minimum relative time difference between the boundaries of two subframe received from reference and measurement cells. That is, the RSTD may be calculated based on the relative time difference between the start of a subframe received from the measurement cell and the start time of a subframe from the reference cell, which is closest to the measurement cell. The reference cell may be selected by the UE.

For accurate OTDOA positioning, it is necessary to measure the times of arrival (ToAs) of signals received from geographically distributed three or more TPs or BSs. For example, ToAs for TP 1, TP 2, and TP 3 may be measured, and an RSTD for TP 1 and TP 2, an RSTD for TP 2 and TP 3, and an RSTD for TP 3 and TP 1 may be calculated based on the three ToAs. Then, a geometric hyperbola may be determined based on the calculated RSTD values, and a point at which the curves of the hyperbola intersect may be estimated as the position of the UE. In this case, each ToA measurement may have inaccuracy and uncertainty, and thus, the estimated position of the UE may be provided as a specific range according to measurement uncertainty.

For example, the RSTD for two TPs may be calculated based on Equation 3 below.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 3]

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, which may be referred to as real time differences (RTDs), and $n_i$ and $n_1$ may be UE ToA measurement error values.

2.5.2. E-CID (Enhanced Cell ID)

In a cell ID (CID) positioning method, the position of the UE may be measured based on geographical information about the serving ng-eNB, serving gNB, and/or serving cell of the UE. For example, the geographical information about the serving ng-eNB, serving gNB, and/or serving cell may be acquired by paging, registration, etc.

In an E-CID positioning method, additional UE measurements and/or NG-RAN radio resources may be further used to improve UE location estimation, compared to the CID positioning method. In the E-CID positioning method, some of the same measurement methods as the RRC protocol measurement control system may be used, but in general, no additional measurements may be performed only for UE positioning. In other words, to measure the location of the UE, any separate measurement configurations or measurement control messages may not be provided. In addition, the UE may not expect that an additional measurement operation is requested for positioning, and the UE may report measurement values obtained through general measurement methods.

For example, the serving gNB may perform the E-CID positioning method based on an E-UTRA measurement value provided by the UE.

The following measurement elements may be used for E-CID positioning.

UE measurement: E-UTRA reference signal received power (RSRP), E-UTRA reference signal received quality (RSRQ), UE E-UTRA reception-transmission time difference (RX-TX time difference), GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance ($T_{ADV}$), and/or angle of arrival (AoA)

Here, $T_{ADV}$ may be divided into Type 1 and Type 2 as follows.

$T_{ADV}$ Type 1=(ng-eNB RX-TX time difference)+(UE E-UTRA RX-TX time difference)

$T_{ADV}$ Type 2=ng-eNB RX-TX time difference

The AoA may be used to measure the direction of the UE. The AoA may be defined as an estimated angle for the location of the UE in the counterclockwise direction from the BS/TP. In this case, the geographical reference direction may be north. The BS/TP may use an UL signal such as a sounding reference signal (SRS) and/or a DMRS for AoA measurement. In addition, the larger the size of antenna arrays, the higher the measurement accuracy of the AoA. When the antenna arrays are placed at the same interval, signals received from adjacent antenna elements may have a constant phase rotate.

2.5.3. UTDOA (Uplink Time Difference of Arrival)

UTDOA is a method of determining the position of the UE by estimating the arrival time of an SRS. To estimate the arrival time of the SRS, a serving cell may be used as the reference cell, and then the position of the UE may be calculated based on an arrival time difference from another cell (or BS/TP). For UTDOA, the E-SMLC may indicate the serving cell of a target UE to instruct the target UE to perform SRS transmission. The E-SMLC may provide configurations such as a periodic/aperiodic SRS, a bandwidth and frequency/group/sequence hopping.

3. Various Embodiments of Present Disclosure

Hereinafter, various embodiments of the present disclosure will be described in detail based on the above technical features. The details described above in sections 1 and 2 may be applied to the embodiments of the present disclosure. For example, operations, functions, and terms not defined in the embodiments of the present disclosure may be executed or explained based on the details in sections 1 and 2.

In this document, an LMF may be regarded as a location server and also be considered as a higher concept/entity including the concept of the location server. In addition, a UE transmission/reception time difference (UE RX-TX time difference) described in this document may be defined as a difference between a time at which the PRS is received on a specific PRS resource and a time at which positioning related information measured for the specific PRS resource is transmitted. Details of the UE RX-TX time difference will be described later.

To configure a timing advance (TA) for the UE, the BS/LMF may require measurements and reports of a UE RX-TX time difference and an NB (eNB/gNB) RX-TX time difference. When the UE RX-TX time difference is measured for the TA configuration, the amount of received signal energy is mainly employed. However, when round trip time (RTT) is used to measure the position of the UE, the UE RX-TX time difference may need to be measured and reported based on the timing of the first detected path of a received signal. In the NR system, since the TRP/BS may transmit RSs on multiple beam(s), ToA may vary from the viewpoint of the UE according to the directions of transmission (TX) beam(s), and thus the UE RX-TX time difference may vary as well. For more accurate UE positioning, the above matters need to be considered.

When the RTT measurement is used for UE positioning, the position of the UE may be measured based on information such as RTT in a single cell and the angle of a TX beam. However, the position of the UE may also be measured according to a multi-cell RTT method. To use the multi-cell RTT method, RTT needs to be measured between several TRP(s)/gNB(s) and the UE. To this end, the BS/LMF may instruct/configure the UE to report the UE RX-TX time difference to the BS/LMF. To accurately report the UE RX-TX time difference, which is reported for the RTT measurement, the UE needs to accurately measure the ToA and report the UE RX-TX time difference by reflecting the ToA.

3.1. Multi-cell RTT Reporting in Consideration of Sweeping of Multiple Transmission and Reception Beams To measure the UE RX-TX time difference and/or ToA for a specific TRP/gNB, the BS/LMF may configure/instruct the UE to report the UE RX-TX time difference and/or ToA for RSs (e.g., PRSs, CSI-RSs, etc.) and/or RS resources transmitted by the TRP/gNB on multiple TX beams. The RSs may be simultaneously transmitted on the multiple TX beams or may be transmitted on a TX beam that change over time (TX beam sweeping). When the UE reports the UE RX-TX time difference, the UE may be instructed/configured to calculate the UE RX-TX time difference based on an RS resource with the minimum propagation delay time, ToA, and/or ToF (time of flight) among propagation delay times, ToAs, and/or ToFs measured/predicted/estimated for the RSs transmitted on the multiple TX beams (here, ToA refers to the travel time required for a radio signal to reach the UE from the transmitter) and then report the UE RX-TX time difference to the BS/LMF.

For example, the UE may be configured/instructed by the BS/LMF to report an RS resource index together with the UE RX-TX time difference or report only the RS resource index. As mentioned above, the RS resource index may indicate a resource for transmitting a specific RS among multiple RSs transmitted from a specific TP/gNB, and a transmission beam used by the TP/gNB may vary for each RS resource. In the present disclosure, an RS resource index may be used equivalently to an RS resource ID.

As described above, the UE RX-TX time difference may be calculated based on an RS resource for receiving the RS with the minimum ToA or propagation delay time among a plurality of RSs, and the RS resource index corresponding to the RS with the minimum ToA or propagation delay time may be reported to the BS/LMF. The above UE operation may be configured/instructed by the BS/LMF. When the RS resource index is reported to the BS, the BS/LMF may improve UE positioning accuracy based on additional information about the TX beam direction. That is, the operation has advantages in that when it is difficult to measure the exact position of the UE only based on the RTT measurement, beam information may be additionally used to measure the location of the UE. Details will be described later.

Figure 13:
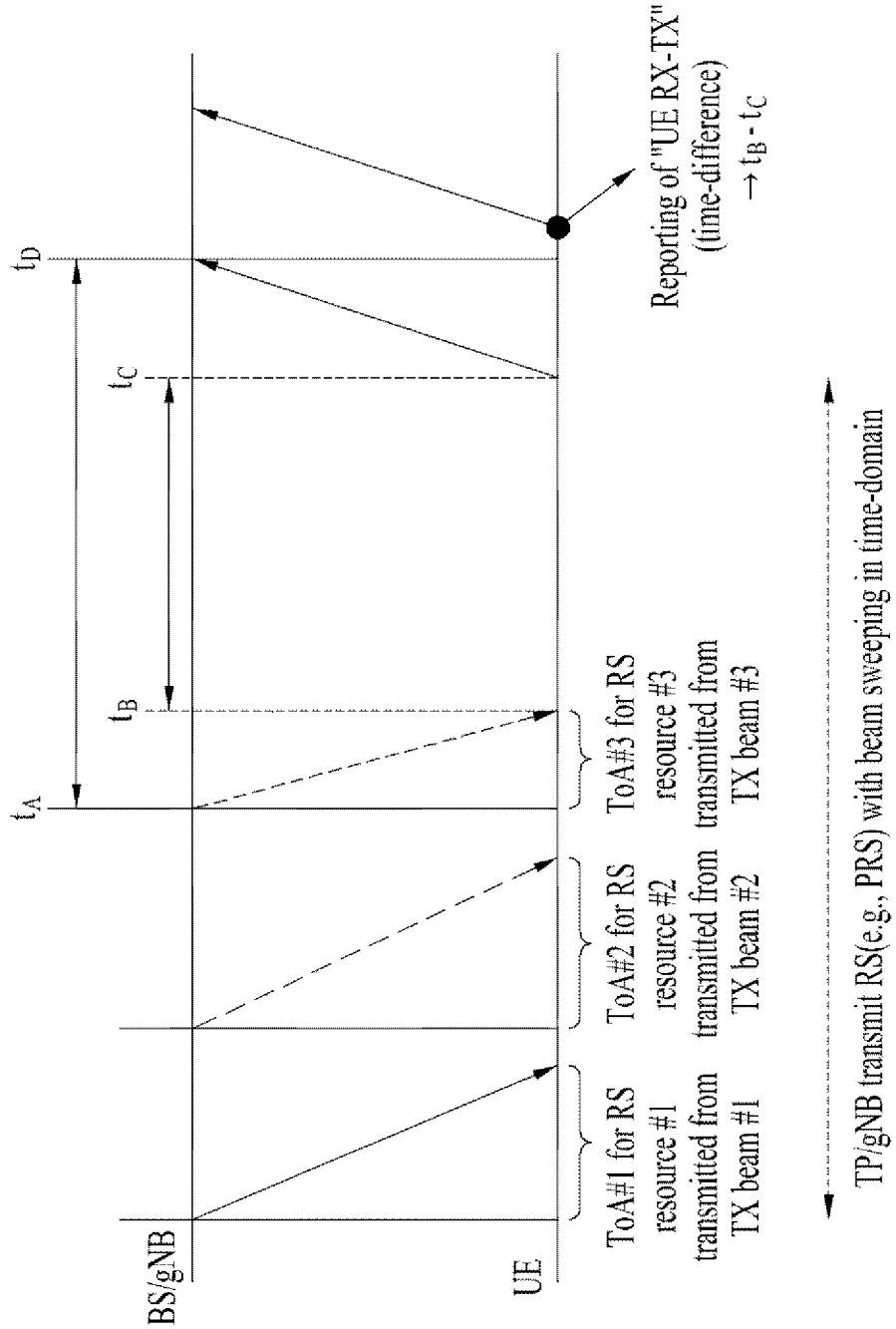
FIG. 13 is a diagram for explaining a UE transmission and reception time difference reported according to an embodiment of the present disclosure.

FIG. 13 is a diagram for explaining the UE RX-TX time difference reported according to an embodiment of the present disclosure.

Referring to FIG. 13, the UE RX-TX time difference may be $t_B-t_C$, the gNB RX-TX time difference may be $t_D-t_A$, and the RTT may be the sum of the UE RX-TX time difference and the gNB RX-TX time difference. In addition, PRS resource #1, PRS resource #2, and PRS resource #3 may correspond to different symbols, and the TP/gNB may transmit PRSs on PRS resources while changing the TX beam for each OFDM symbol.

For example, it may be assumed that for RTT-based UE positioning, a specific TP/gNB transmits RSs while changing the TX beam for each symbol. FIG. 13 exemplarily shows that the UE measures ToAs or ToFs when a specific gNB transmits different RSs while performing TX beam sweeping in three symbols. As shown in FIG. 13, the ToA or ToF may vary for different TX beams. Since the ToA or ToF for TX beam #3 is the minimum, the UE may be configured/instructed to calculate the UE RX-TX time difference based on the arrival time of an RS transmitted on TX beam #3 and report the UE RX-TX time difference to the BS/LMF. In FIG. 13, the arrival time of TX beam #3 is $t_B$, and the UE RX-TX time difference is $t_B - t_C$.

In addition to the UE RX-TX time difference, the UE may report the RS resource index (having the minimum ToA or ToF) to the BS/LMF.

Meanwhile, UE positioning may be performed based on multi-cell RTT by using the CSI-RS. The BS/LMF may configure/instruct the UE to report the UE RX-TX time difference together with a CSI-RS resource and/or a CSI-RS resource set. For example, when three CSI-RS resources where higher layer parameter repetition="OFF" are respectively transmitted in three OFDM symbols, the UE may perform reception by assuming that the TP/gNB changes the TX beam for each CSI-RS resource and measure the ToA for the CSI-RS resource transmitted in each symbol. Considering the above example with reference to FIG. 13, it may be taken into consideration that CSI-RS resources #1, #2, and #3 are transmitted in three consecutive or inconsecutive symbols. The UE may assume a transmission time based on the symbol in which each RS resource is configured. In addition, the UE may measure or predict a propagation delay time or ToF by measuring the reception ToA. Assuming that CSI-RS resource #3 has the shortest propagation delay time, the UE may calculate the UE RX-TX time difference for CSI-RS resource #3 in the same way as the above-described UE RX-TX time difference calculation method and then report the UE RX-TX time difference to the BS.

Figure 14:
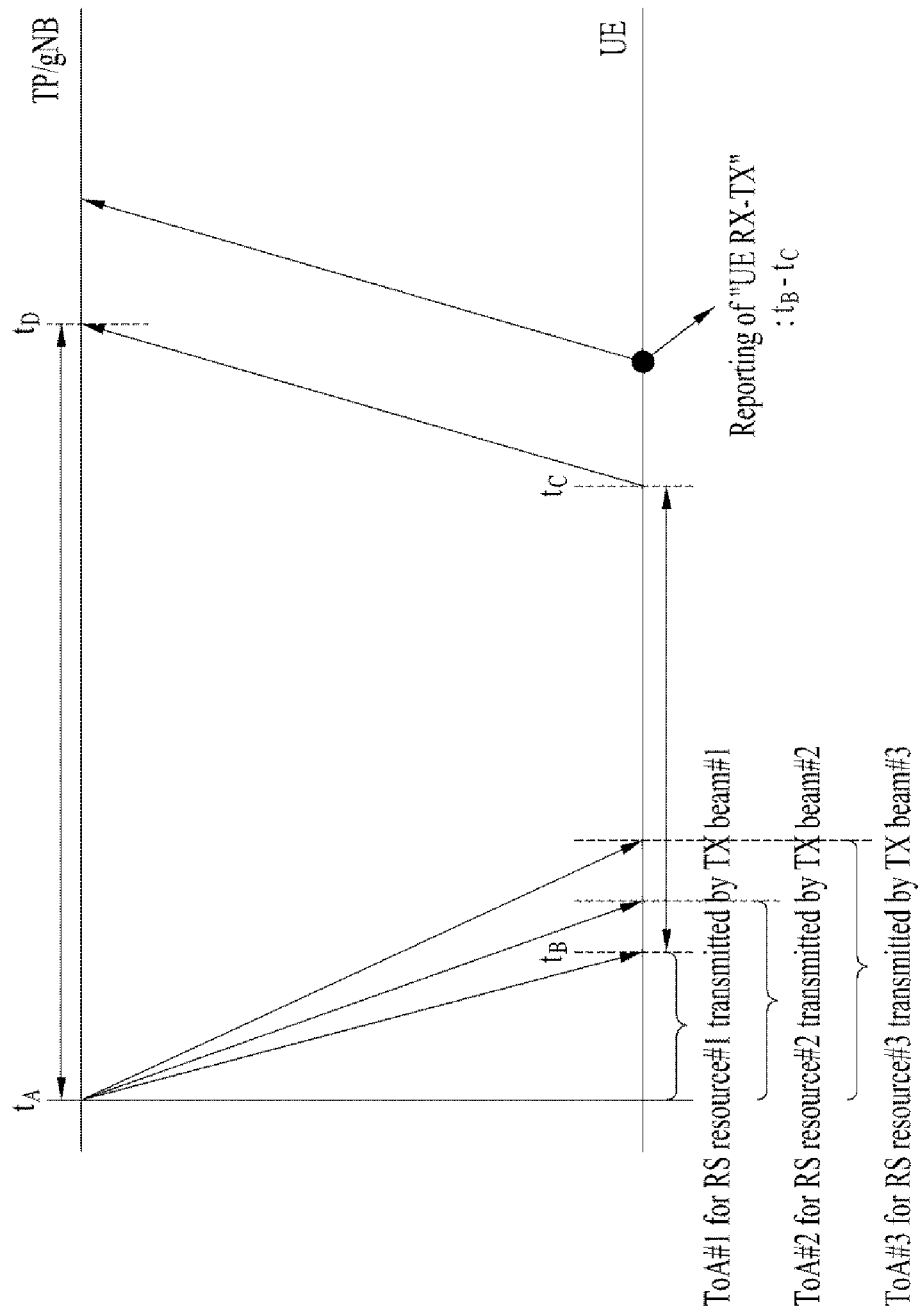
FIG. 14 is a diagram for explaining a UE transmission and reception time difference reported according to another embodiment of the present disclosure.

FIG. 14 is a diagram for explaining the UE RX-TX time difference reported according to another embodiment of the present disclosure.

Referring to FIG. 14, the UE RX–TX time difference may be $t_B - t_C$, the gNB RX-TX time difference may be $t_D - t_A$, and the RTT may be the sum of the UE RX-TX time difference and the gNB RX-TX time difference.

Unlike the above description, when a specific TP/gNB simultaneously transmits RSs (e.g., PRS, CSI-RS, etc.) on a plurality of TX beams, the UE may be configured/instructed to measure the ToA for each of the RSs transmitted on the plurality of TX beams and report the UE RX-TX time difference to the BS/LMF. In this case, the UE may calculate the UE RX-TX time difference based on an RS with the minimum ToA or ToF among the RSs transmitted on the TX beams and report the UE RX-TX time difference to the BS/LMF. The above-described UE operation may be configured/instructed by BS/LMF. Considering the above example with reference to FIG. 14, the TP/gNB may transmit three RSs on three TX beams at a specific time point, and the UE may measure ToAs or ToFs for RS resources on which the RSs are transmitted. The UE measures and reports the UE RX-TX time difference based on an RS resource with the minimum ToA. In addition, the UE may report the RS resource index corresponding to the measured and reported UE RX-TX time difference together or report only the RS resource index.

In the above-described embodiments related to multi-cell RTT reporting, the TP/gNB may additionally transmit to the UE information about a time at which the RS is transmitted. For example, when the TP/gNB transmits PRSs, even if the TP/gNB transmits the PRSs by changing the TX beam for each symbol, timing alignment between the UE and gNB/TP may not match. Thus, the PRS transmission time (e.g., symbol boundary) of the BS considered by the UE may be different from the time at which the BS actually transmits the PRS, so that the UE may have a problem in measuring the ToA of the PRS and/or the UE RX-TX time difference for each TX beam. To solve the above-described problem, information on the time at which the TP/gNB transmits the RS may need to be signaled.

For example, when PRSs are transmitted on a plurality of PRS resources as the RS, information on the plurality of PRS resources and information about transmission times of the plurality of PRS resources may be additionally signaled to the UE. The PRSs and the plurality of PRS resources may be transmitted based on the transmission time information. The UE may measure information related to positioning (e.g., UE RX-TX time difference, etc.) for each of the plurality of PRS resources based on the transmission time information.

In the above-described embodiments, a case in which the BS has one or more TX panels may be considered. In this case, one PRS resource set corresponding to each TX panel may be considered, and a plurality of RS (e.g., CSI-RS, PRS, SSB) resource sets corresponding to a plurality of TX panels may also be considered. Here, the PRS resource set may be a set including at least one PRS resource, and each PRS resource set may have a PRS resource set ID.

In this case, the UE may be configured/instructed to report to the BS/LMF an RS resource index and UE RX-TX time difference with the minimum propagation delay time and/or ToA among RS resources in each RS resource set. That is, the UE may be configured/instructed to report to the BS/LMF one RS resource index and/or UE RX-TX time difference for each RS resource set.

When the BS and UE have one or more TX/RX panels, the UE may be configured/instructed to report an RS resource index and/or UE RX-TX time difference with the minimum propagation delay time or ToA among all possible TX/RX panel combinations of the BS and UE for RS (e.g., PRS) transmission (for example, when the BS has TX panel #1 and TX panel #2 and the UE has RX panel #1 and RX panel #2, there are four TX/RX panel combinations). That is, the index of a specific PRS resource may be transmitted for each PRS resource set related to a combination of at least one TX beam and at least one RX beam.

The above-described embodiments of the present disclosure may be applied not only between a specific TP/cell and the UE but also between multiple TP(s)/cell(s) and the UE. For example, the UE RX-TX time difference may be measured and reported based on a specific RS resource (specific TX beam) having the minimum propagation delay time, ToA, or ToF for RSs transmitted by each BS/cell on a plurality of TX beams. The above UE operation may be configured/instructed by the BS/LMF. The UE operation according to the present disclosure may be defined as a default operation even if there are no separate configurations/instructions from the BS/LMF.

Figure 15:
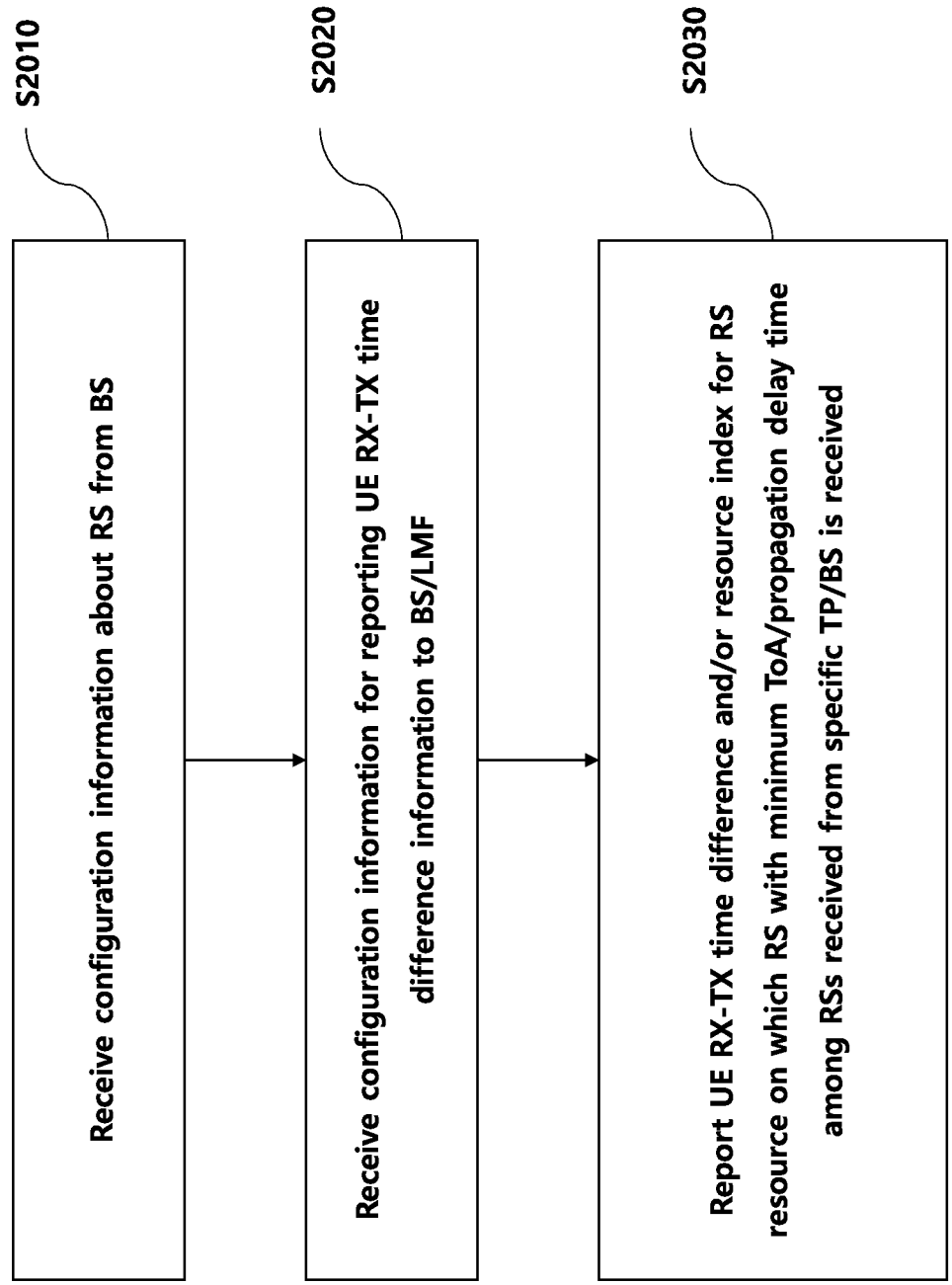
FIG. 15 is a diagram for explaining operations of a UE according to an embodiment of the present disclosure.

FIG. 15 is a diagram for explaining operations of the UE according to an embodiment of the present disclosure.

Referring to 15, the UE may receive configuration information about an RS from the BS in step S2010. Here, the configuration information about the RS may include, for example, information about an RS resource index and/or an RS resource set index.

In step S2020, the UE may receive configuration information for reporting UE RX-TX time difference information to BS/LMF. Here, the configuration information for reporting the UE RX-TX time difference information to the BS/LMF may include the configuration of a specific RS resource for the UE to calculate the UE RX-TX time difference as described above in the embodiments.

In step S2030, the UE may report a UE RX-TX time difference and/or an RS resource index for an RS resource on which an RS having the minimum ToA and/or propagation delay time among RSs received from a specific TP/BS is received.

Figure 16:
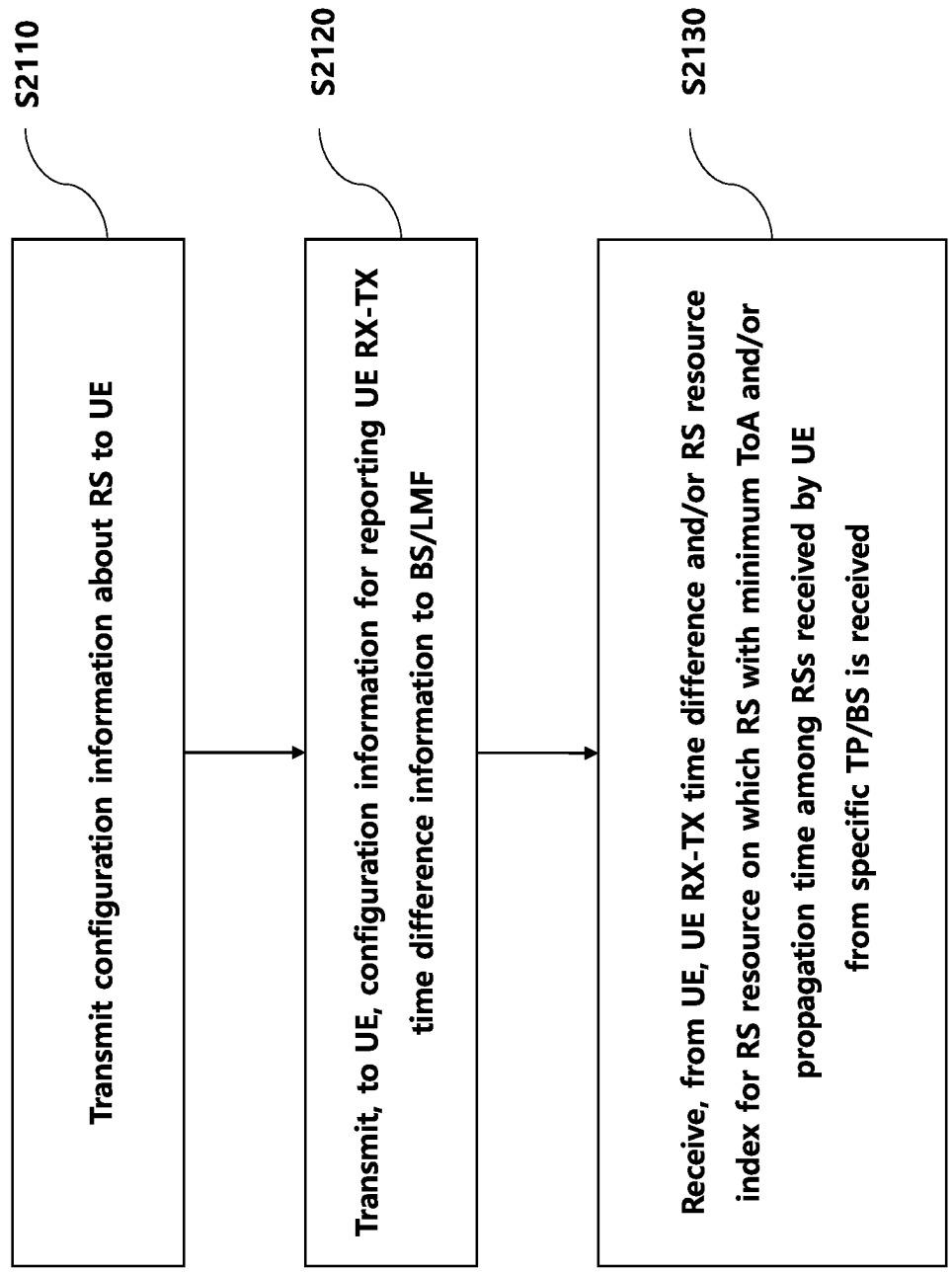
FIG. 16 is a diagram for explaining operations of a base station (BS) according to an embodiment of the present disclosure.

FIG. 16 is a diagram for explaining operations of the BS according to an embodiment of the present disclosure.

Referring to FIG. 16, the BS may transmit configuration information about an RS to the UE in step S2110. Here, the configuration information about the RS may include, for example, information about an RS resource index and/or an RS resource set index.

In step S2120, the BS may transmit to the UE configuration information for the UE to report UE RX-TX time difference information to the BS/LMF. Here, the configuration information for reporting the UE RX-TX time difference information to the BS/LMF may include the configuration of a specific RS resource for the UE to calculate the UE RX-TX time difference as described above in the embodiments.

In step S2130, the BS may receive a UE RX-TX time difference and an RS resource index for an RS resource on which an RS having the minimum ToA and/or propagation delay time among RSs transmitted to the UE is received.

According to the above-described embodiments of the present disclosure, UE positioning may be effectively performed based on RTT information between a UE and multiple BSs/cells using a plurality of TX beams. In addition to the RTT information, an RS resource index (TX beam index) may be reported together and used for the UE positioning.

However, it may be difficult for the BS/LMF/UE to obtain RTT information between the UE and three or more TPs/gNBs due to problems in UL RS transmission coverage of the UE. In this case, to measure the location of the UE, other information may be further used in addition to RTT measurements such as TX beam information.

For example, when the BS/LMF knows that a specific UE may measure the UE RX-TX time difference for the serving cell/BS and one neighboring cell/TP/BS, the BS/LMF may calculate the location of the UE based on information about TX beam directions of the BS/TP according to a two-cell based multi-cell RTT method.

According to the two-cell based multi-cell RTT method, the BS/LMF may configure/instruct the UE to: measure ToAs for RS resources (e.g., PRS resources) on which RSs transmitted from two TPs/gNBs on different TX beams are received; and report the index of an RS resource on which an RS with the minimum propagation delay time, ToA, or ToF among the RSs transmitted on the different TX beams from each TP/gNB is received and a UE RX-TX time difference related to the RS resource index. That is, when the UE reports the RS resource index and UE RX-TX time difference per TP/gNB for the RSs transmitted from the two TPs/gNBs to the BS/LMF, the BS/LMF may draw two circles based on the two-cell based multi-cell RTT method and find two intersections of the two circles. In this case, the two intersections become possible positions at which the UE may be located.

Figure 17:
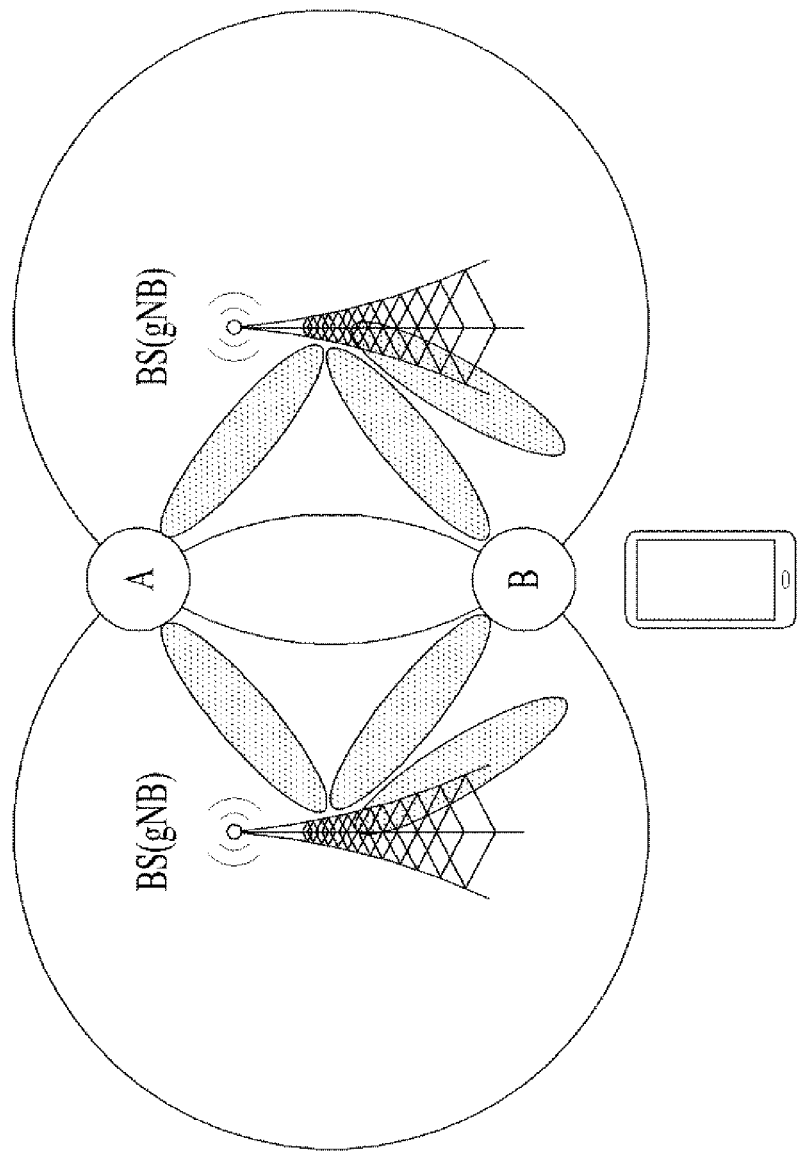
FIG. 17 is a diagram for explaining a two-cell based multi-cell round trip time (RTT) method according to an embodiment of the present disclosure.

FIG. 17 is a diagram for explaining the two-cell based multi-cell RTT method according to an embodiment of the present disclosure.

Referring to FIG. 17, points A and B are possible positions at which the UE may be located. The BS/LMF may estimate/know the direction of a beam transmitted by the TP/gNB based on RS resource index information reported by the UE, and finally determine the location of the UE. That is, to determine the location of the UE as described above, the LMF needs to know the direction of each TX beam of the TP/gNB transmitting the RS (e.g., PRS).

As another example, it may be considered that the BS/LMF configures/instructs the UE to report the UE RX-TX time difference between three or more cells/TPs/BSs and the UE, but the UE is capable of obtaining the UE RX-TX time difference for one neighboring cell/BS including the serving cell. In this case, the UE may report to the BS/LMF the UE RX-TX time difference for each cell/BS and an RS resource index (or RS resource indices) used for measuring the UE RX-TX time difference. As mentioned above, the RS resource index is an RS resource index showing the minimum ToA, ToF, or propagation delay time for RS resources used by each BS/cell to transmit RSs. For two cells/BS, only one RS resource index may be reported, or two RS resource indices may be reported. The above-described UE operation may be configured/instructed by the BS/LMF.

3.2. Reporting of Positioning Information Based on Reliability/Quality of Measured Values For the above-described multi-cell RTT-based UE positioning, the UE needs to report the UE RX-TX time difference between multiple cells/BSs and the UE to the BS/LMF. The BS/LMF may perform UE positioning based on the UE RX-TX time difference for the cell/BS, which is reported by the UE. In this case, the BS/LMF may perform the UE positioning more effectively if the BS/LMF knows information about the reliability/quality of the UE RX-TX time difference reported by the UE. That is, if the UE reports the UE RX-TX time difference together with the measurement reliability/quality thereof, the BS/LMF may perform the UE positioning more effectively.

The BS/LMF may define/configure the UE that the measurement reliability and/or quality of the UE RX-TX time difference for each cell/BS is similar to the ToA quality for an RS and/or RS resource transmitted from each cell/BS. That is, the reliability may be defined in consideration of the error/error range of a ToA measured for a specific RS and/or RS resource. For example, the quality for OTDOA/ToA may be equivalent to the OTDOA measurement quality defined in 3GPP 36.355 (Rel-15). The OTDOA measurement quality is defined as "OTDOA—MeasQuality". The error values and error resolutions for ToA have been defined as shown in Table 10 below.

TABLE 10

OTDOA-MeasQuality

```
-- ASN1START
OTDOA-MeasQuality : := SEQUENCE {
    error-Resolution      BIT STRING (SIZE (2) ),
    error-Value                       BIT STRING (SIZE (5) ) ,
    error-NumSamples      BIT STRING (SIZE (3) )                              OPTIONAL,
```

TABLE 10-continued

OTDOA-MeasQuality

...
}
-- ASN1STOP

OTDOA-MeasQuality field descriptions error-Resolution
This field specifies the resolution R used in error-Value field. The encoding on two bits is as follows:

| | |
|---|---|
| '00' | 5 meters |
| '01' | 10 meters |
| '10' | 20 meters |
| '11' | 30 meters. | error-Value
This field specifies the target device's best estimate of the uncertainty of the OTDOA (or TOA) measurement. The encoding on five bits is as follows:

| | | | |
|---|---|---|---|
| '00000' | 0 | to | (R*1-1) meters |
| '00001' | R*1 | to | (R*2-1) meters |
| '00010' | R*2 | to | (R*3-1) meters |
| ... | | | |
| '11111' | R*31 | | meters or more; | where R is the resolution defined by error-Resolution field.
E.g., R = 20 m corresponds to 0-19 m. 20-39 m, . . . 620+ m.

error-NumSamples
If the error-Value field provides the sample uncertainty of the OTDOA (or TOA) measurement, this field specifies how many measurements have been used by the target device to determine this (i.e., sample size). Following 3 bit encoding is used:

| | |
|---|---|
| '000' | Not the baseline metric |
| '001' | 5-9 |
| '010' | 10-14 |
| '011' | 15-24 |
| '100' | 25-34 |
| '101' | 35-44 |
| '110' | 45-54 |
| '111' | 55 or more. |

In case of the value '000', the error-Value field contains the target device's best estimate of the uncertainty of the OTDOA (or TOA) measurement not based on the baseline metric. E.g., other measurements such as signal-to-noise-ratio of signal strength can be utilized to estimate the error-Value.
If this field is absent, the value of this field is '000'.

The above-described OTDOA/TOA measurement quality may be defined/configured for multiple RS (e.g., PRS) resources transmitted by the same TP/BS.

The above-described UE RX-TX time difference quality may be defined/configured for multiple RS (e.g., PRS) resources transmitted by the same TP/BS.

In the following, embodiments in which a specific measurement among measurements and an RS resource index related thereto are reported based on the reliability/quality of UE positioning measurements.

3.2.1. Multi-Cell RTT

The BS/LMF may configure/instruct the UE to report UE RX-TX time differences for M RSs having the best UE RX-TX time difference and/or ToA quality among RSs (e.g., PRS, CSI-RS, etc.) transmitted from N TPs/BSs and/or report the UE RX-TX time differences together with RS resource indices for the M RSs. Here, N and M may be natural numbers greater than 0, and N may be equal to or greater than M. M-best reporting for UE RX-TX time difference measurements may consider the following two cases. Hereinafter, the M-best reporting described in the present disclosure means that the following cases are all included, even unless specified otherwise.

3.2.1.1. M-Best Reporting for Single TP/gNB/Cell

A single TP/gNB/cell may transmit RSs on N RS resources (e.g., PRS resources). The BS/LMF may configure/instruct to the UE to report M UE RX-TX time differences and/or M RS resource indices with the best quality among the N RSs. Here, the M UE RX-TX time differences with the best quality reported by the UE may be values measured for M PRS resources in descending order of positioning related information (e.g., UE RX-TX time difference) quality among a plurality of PRS resources received by the UE.

For example, the BS/LMF may selectively use one specific value among the reported M UE RX-TX time differences for RTT calculation. In addition, the BS/LMF may use information about the TX beam direction of the TP/gNB in addition to M UE RX-TX time differences and M RS resource indices reported for another TP/gNB/cell in order to obtain the location of the UE.

3.2.1.2. M-best Reporting for Multiple TPs/gNBs/Cells

The BS/LMF may configure/instruct to the UE to report M UE RX-TX time differences and/or M RS resource indices with the best quality among RSs transmitted by total N TPs/gNB/cells on RS resources (e.g., PRS resources). That is, the BS/LMF may use the best quality of UE RX-TX time differences and/or RS resource indices for M TP/gNBs for UE positioning.

Additionally/alternatively, the BS/LMF may configure/instruct the UE to report not only all UE RX-TX time differences measured for RSs (e.g., PRS, CSI-RS, etc.)

transmitted from each TP/BS but also information about the M UE RX-TX time differences with the best quality. For example, the M RS (e.g., PRS) resource indices corresponding to the M UE RX-TX time differences with the best quality may be reported together. In this case, information about an RS resource set index and/or information about a TP/BS/cell that transmits each RS resource may also be reported together with each RS resource index.

For example, considering a case where the RS is the PRS and M=1, the UE may report the ID (=index) of a specific PRS resource among a plurality of PRS resources and the ID (=index) of a PRS resource set including the specific PRS resource based on the UE RX-TX time difference, which is positioning related information, and the quality of the UE RX-TX time difference. In addition, only one of the ID of the specific PRS resource and the ID of the specific PRS resource set may be reported. In addition to the ID of the specific PRS resource and the ID of the specific PRS resource set, the ID of a TRP related to the PRS resource set including the specific PRS resource may be reported.

When the BS/LMF determines the location of the UE based on the above-described M-best reporting according to the multi-cell RTT method, the UE positioning accuracy may be improved by excluding measurements with low reliability, and unnecessary reporting overhead of the UE may be reduced.

3.2.1.3. Above Quality

Unlike the above-described M-best reporting, the BS/LMF may configure/instruct the UE to report only UE RX-TX time differences ensuring a predetermined level of quality to the BS/LMF. Here, the UE RX-TX time differences ensuring the predetermined level of quality may be values measured for PRS resources where the quality of positioning related information (e.g., UE RX-TX time difference) is more than or equal to a predetermined value.

In addition, the BS/LMF may configure/instruct the UE to additionally report RS resource information (RS resource index) for the UE RX-TX time differences ensuring the predetermined level of quality to the BS/LMF. Here, the predetermined level of quality may be a specific threshold and be defined as a default value, and the specific threshold may be configured/indicated by the BS/LMF for/to the UE.

3.2.2. OTDOA 3.2.2.1. M-Best Reporting

The BS/LMF may configure/instruct the UE to report RSTD measurements for M RSs with the best OTDOA/ToA measurement quality among RSs (e.g., PRS, CSI-RS, etc.) transmitted from N TPs/BSs to the UE.

The BS/LMF may configure/instruct the UE to report not only all RSTD measurements measured for RSs (e.g., PRS, CSI-RS, etc.) transmitted from each TP/BS but also information about RS resources for the M RSTD measurements with the best quality. For example, M RS (e.g., PRS) resource indices corresponding to the M RSTD measurements with the best quality may be reported together. In this case, information about an RS resource set index and/or information about a TP/BS/cell that transmits each RS resource may also be reported together with each RS resource index.

When the BS/LMF determines the location of the UE based on the above-described M-best reporting according to the OTDOA method, accuracy may be improved by excluding unnecessary RSTD measurements, and unnecessary reporting overhead may be reduced.

3.2.2.2. Above Quality

Unlike the above-described M-best reporting, the BS/LMF may configure/instruct the UE to report only UE RX-TX time differences ensuring a predetermined level of quality to the BS/LMF. In addition, the BS/LMF may configure/instruct the UE to additionally report RS resource information (RS resource index) for the UE RX-TX time differences ensuring the predetermined level of quality to the BS/LMF. Here, the predetermined level of quality may be a specific threshold and be defined as a default value, and the specific threshold may be configured/indicated by the BS/LMF for/to the UE.

The embodiments of the present disclosure described in sections 3.2.1 to 3.2.2 may be similarly extended/applied to various measurements measured for DL RSs (RS resources), and the extension/application may be considered to be within the spirit of the present disclosure. For example, the embodiments described above in sections 3.2.1 to 3.2.2 may be extended/applied to, for example, angle measurements (e.g., AoA) measured by the UE as well as the above-described UE RX-TX time difference and RSTD measurements.

Figure 18:
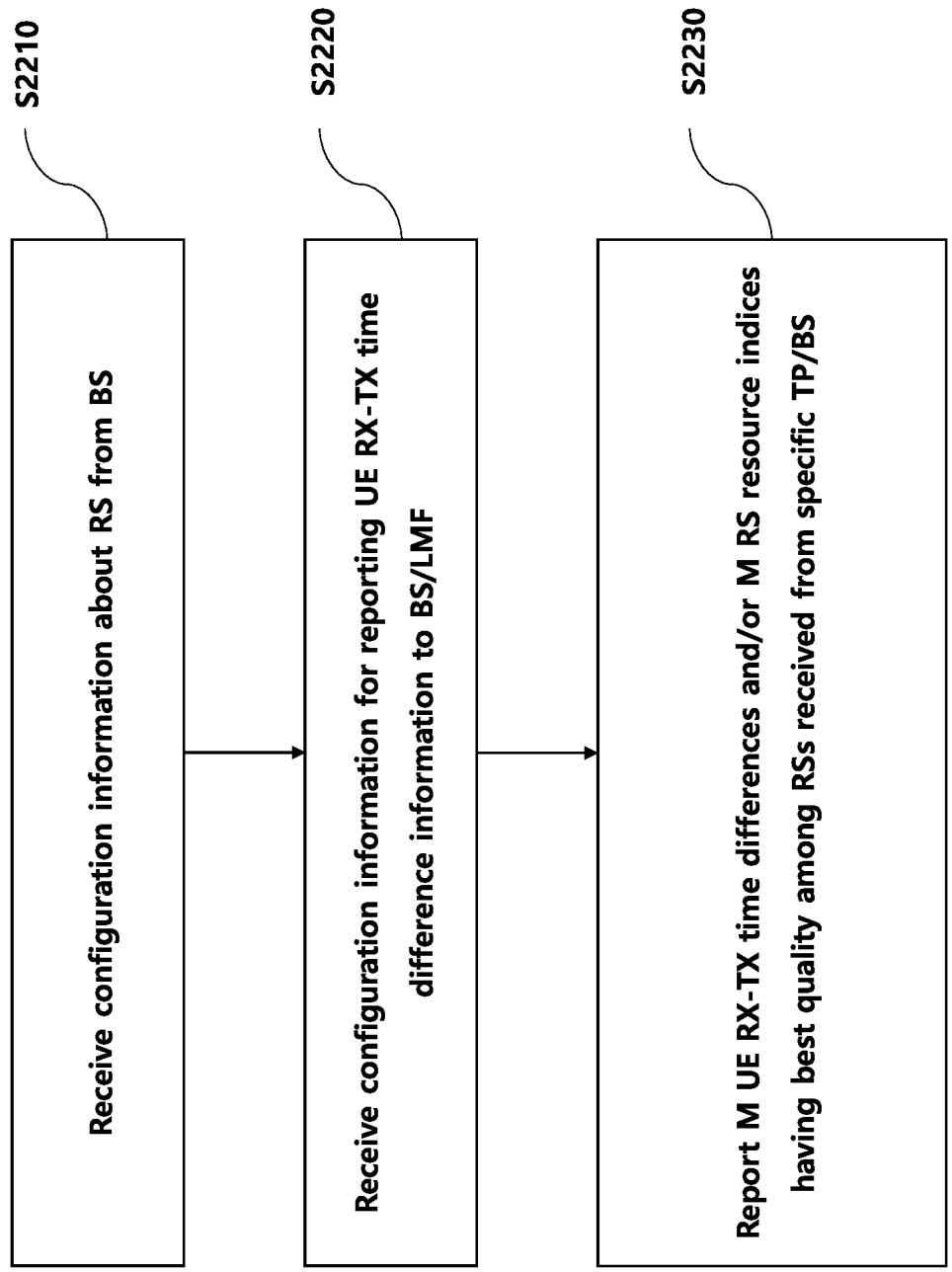
FIG. 18 is a diagram for explaining UE operations based on M-best reporting according to an embodiment of the present disclosure.

FIG. 18 is a diagram for explaining UE operations based on the M-best reporting according to an embodiment of the present disclosure.

Referring to 18, the UE may receive configuration information about an RS from the BS in step S2210. Here, the configuration information about the RS may include, for example, information about an RS resource index and/or an RS resource set index.

In step S2220, the UE may receive configuration information for reporting UE RX-TX time difference information to the BS/LMF. Here, the configuration information for reporting the UE RX-TX time difference information to the BS/LMF may include the configuration of a specific RS resource for the UE to calculate the UE RX-TX time difference as described above in the embodiments.

In step S2230, the UE may report M UE RX-TX time differences and/or M RS resource indices having the best quality among RSs received from a specific TP/BS.

Figure 19:
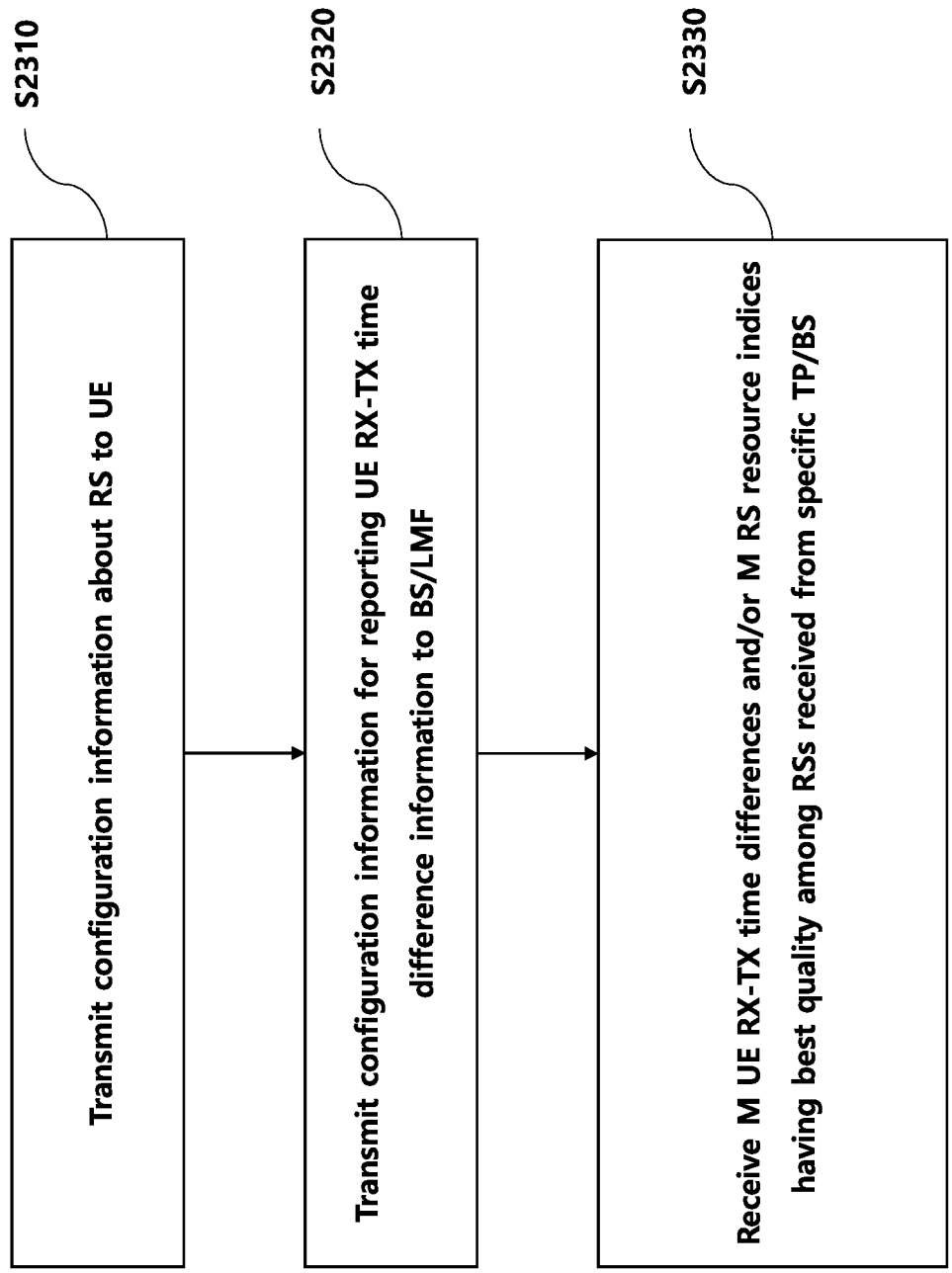
FIG. 19 is a diagram for explaining BS operations based on M-best reporting according to an embodiment of the present disclosure.

FIG. 19 is a diagram for explaining BS operations based on the M-best reporting according to an embodiment of the present disclosure.

Referring to FIG. 19, the BS may transmit configuration information about an RS to the UE in step S2310. Here, the configuration information about the RS may include, for example, information about an RS resource index and/or an RS resource set index.

In step S2320, the BS may transmit to the UE configuration information for the UE to report UE RX-TX time difference information to the BS/LMF. Here, the configuration information for reporting the UE RX-TX time difference information to the BS/LMF may include the configuration of a specific RS resource for the UE to calculate the UE RX-TX time difference as described above in the embodiments.

In step S2330, the BS may receive M UE RX-TX time differences and/or M RS resource indices having the best quality among RSs transmitted to the UE.

Meanwhile, each of the steps of FIGS. 18 and 19 may be performed simultaneously or independently. In addition to the UE RX-TX time difference mentioned in FIGS. 18 and 19, RSTD measurement for OTDOA or AoA measurement used for angle-based UE positioning may also be considered.

3.3. Hybrid Method

According to an embodiment of the present disclosure, the UE positioning accuracy may be improved when both the multi-cell RTT method and the OTDOA method are used together in determining the location of the UE. In the multi-cell RTT method, since the coverage of a UL RS (e.g., SRS, UL PRS, etc.) transmitted by the UE is smaller than that of a DL RS (e.g., PRS), it may be difficult to obtain RTT measurements for a number of cells/gNBs/TPs. On the contrary, in the OTDOA method, RSTD measurements may be obtained for a number of TPs/cells/BSs. In consideration of this point, the following UE reporting operation may be considered.

First, the UE may be configured/instructed to report RSTD measurements for N cells/gNBs/TPs and M UE RX-TX time differences for M cells/gNBs/TPs among the N cells/gNBs/TPs to the BS/LMF.

That is, information reported by the UE to the BS/LMF may include the N RSTD measurements and the M UE RX-TX time differences.

In this case, a criterion for selecting the M UE RX-TX time differences, which is a part of the N cells/gNBs/TPs, may be ToA quality for the N cells/gNBs/TPs as described above.

The ToA measurement quality may be configured/indicated for OTDOA measurement quality or UE RX-TX time difference quality. Here, the OTDOA measurement quality and the UE RX-TX time difference quality may be conceptually the same in terms of the ToA measurement quality, but they may be different in terms of configuration/indication/reporting.

When the BS/LMF configures/instructs the UE to report UE RX-TX time differences for M cells/gNBs/TPs among N cells/gNBs/TPs, the BS/LMF may explicitly inform the UE of specific M TPs/BSs/gNBs/cells. In this case, the specific M TPs/BSs/gNBs/cells may be indicated by TP IDs/cell IDs, RS resource indices, and/or RS resource set indices.

3.4. Network Initial Access and Communication Processes

According to various embodiments of the present disclosure, the UE may perform a network access process to perform the above-described/proposed procedures and/or methods. For example, a UE may receive and store system information and configuration information required to perform the above-described/proposed procedures and/or methods in a memory while accessing the network (e.g., BS). The configuration information required for various embodiments of the present disclosure may be received through higher layer signaling (e.g., RRC layer signaling, medium access control (MAC) layer signaling, etc.).

Figure 20:
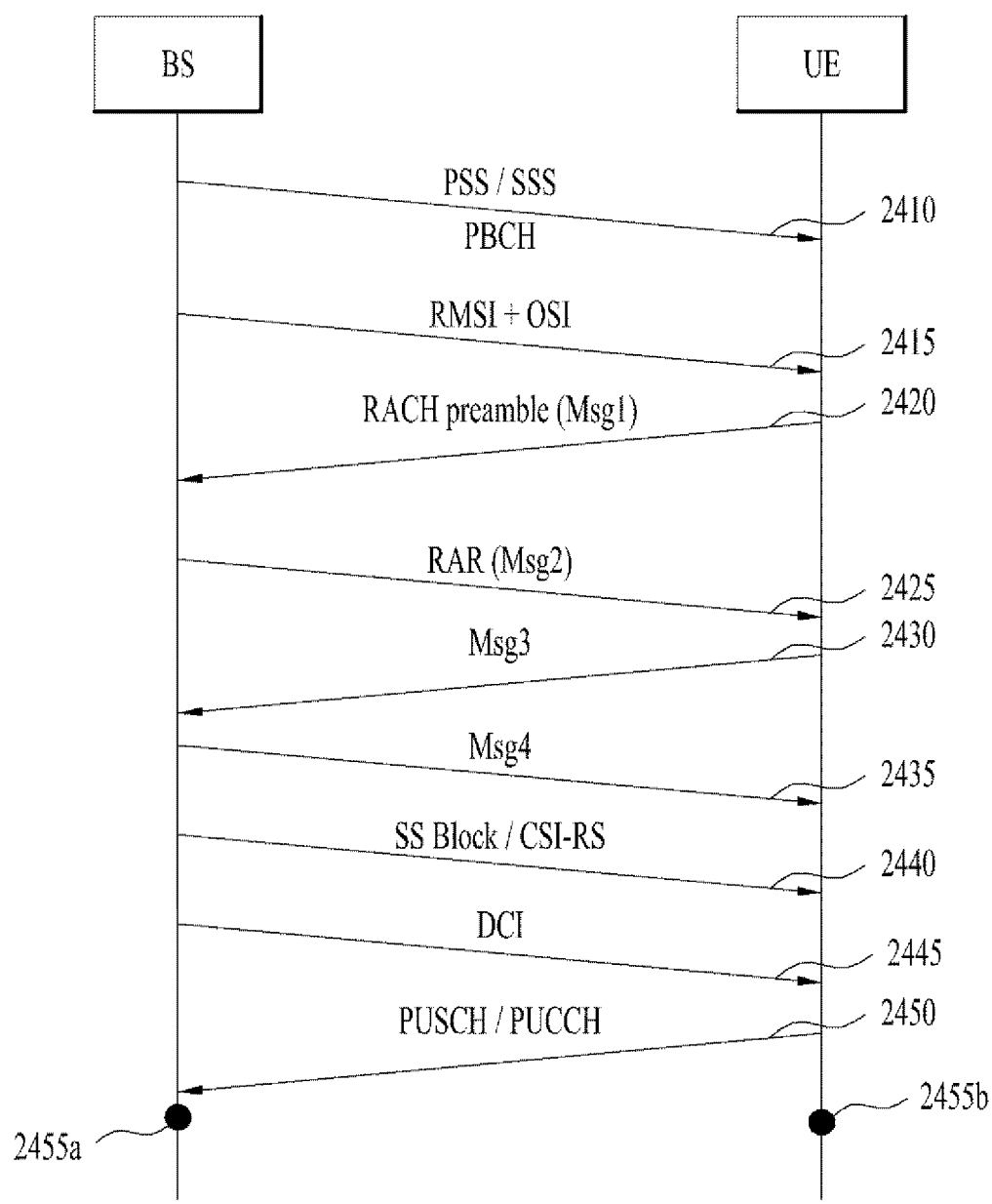
FIG. 20 is a diagram illustrating network initial access and subsequent communication processes according to various embodiments of the present disclosure.

FIG. 20 is a diagram illustrating network initial access and subsequent communication processes according to various embodiments of the present disclosure. In the NR system to which various embodiments of the present disclosure are applicable, a physical channel and an RS may be transmitted by beamforming. When beamforming-based signal transmission is supported, a beam management process may be performed to align beams between the BS and UE. Further, a signal proposed in various embodiments of the present disclosure may be transmitted/received by beamforming. In RRC IDLE mode, beam alignment may be performed based on an SSB (or SS/PBCH block), whereas in RRC CONNECTED mode, beam alignment may be performed based on a CSI-RS (in DL) and an SRS (in UL). When beamforming-based signal transmission is not supported, beam-related operation may be skipped in the following description.

Referring to FIG. 20, the BS may periodically transmit an SSB (2410). The SSB may include a PSS/SSS/PBCH. The SSB may be transmitted by beam sweeping. Subsequently, the BS may transmit remaining minimum system information (RMSI) and other system information (OSI) (2415). The RMSI may include information (e.g., PRACH configuration information) required for the UE to initially access the BS. The UE may transmit a random-access channel (RACH) preamble (Message 1 (Msg1)) to the BS on a PRACH resource linked/corresponding to the index (i.e., beam) of the best SSB (2420). The beam direction of the RACH preamble is associated with the PRACH resource. The association between the SSB (index) and the PRACH resource (and/or RACH preamble) may be configured by system information (e.g., RMSI). Subsequently, as a part of a RACH procedure, the BS may transmit a random access response (RAR) (Msg2) in response to the RACH preamble (2425), and the UE may transmit Msg3 (e.g., RRC Connection Request) using a UL grant in the RAR (2430). The BS may transmit a contention resolution message (Msg4) (2435). Msg4 may include an RRC Connection Setup message.

When an RRC connection is established between the BS and UE through the RACH procedure, subsequent beam alignment may be performed based on an SSB/CSI-RS (in DL) and an SRS (in UL). For example, the UE may receive the SSB/CSI-RS (2440). The UE may use the SSB/CSI-RS to generate a beam/CSI report. The BS may request the beam/CSI report to the UE by DCI (2445). In this case, the UE may generate the beam/CSI report based on the SSB/CSI-RS, and transmit the generated beam/CSI report to the BS on a PUSCH/PUCCH (2450). The beam/CSI report may include a beam measurement result, information about a preferred beam information, and so on. The BS and UE may switch beams based on the beam/CSI report (2455a and 2455b).

Thereafter, the UE and BS may perform the above-described/proposed procedures and/or methods. For example, each of the UE and BS may transmit a radio signal by processing information stored in a memory or process a received radio signal and store the processed radio signal in the memory according to various embodiments of the present disclosure, based on configuration information obtained in the network access process (e.g., system information acquisition process, RRC connection process through an RACH, and so on). The radio signal may include at least one of a PDCCH, a PDSCH, or an RS on DL and at least one of a PUCCH, a PUSCH, or an SRS on UL.

3.5. Discontinuous Reception (DRX) Operation

FIG. 21 is a diagram illustrating DRX operation according to various embodiments of the present disclosure.

According to various embodiments of the present disclosure, the UE may perform DRX operation while executing the above-described/proposed procedures and/or methods. When the UE is configured with DRX, the UE may reduce power consumption by receiving DL signals discontinuously. DRX may be performed in RRC_IDLE, RRC_INACTIVE, and RRC_CONNECTED states. In the RRC_IDLE and RRC_INACTIVE states, DRX may be used to receive paging signals discontinuously.

3.5.1. RRC_CONNECTED DRX

In the RRC_CONNECTED state, DRX may be used to receive PDCCHs discontinuously. For clarity of description, DRX performed in the RRC_CONNECTED state is referred to as RRC_CONNECTED DRX.

Referring to FIG. 21(a), a DRX cycle includes an ON duration and an opportunity for DRX. The DRX cycle defines a time interval in which the ON duration is periodically repeated. The ON duration is a time period during which the UE performs monitoring to receive a PDCCH. When DRX is configured, the UE performs PDCCH monitoring during the ON duration. If the UE successfully detects any PDCCH during the PDCCH monitoring, the UE starts an inactivity timer and maintains an awake state. On the other hand, if the UE detects no PDCCH during the PDCCH monitoring, the UE enters a sleep state after expiration of the ON duration. Therefore, when DRX is configured, PDCCH monitoring/reception may be performed discontinuously in the time domain while the afore-described/proposed procedures and/or methods are performed. For example, when DRX is configured, PDCCH reception occasions (e.g., slots including a PDCCH search space) may be configured to be discontinuous according to DRX configurations. On the contrary, when no DRX is configured, PDCCH monitoring/reception may be performed continuously in the time domain while the afore-described/proposed procedures and/or methods are performed. For example, when no DRX is configured, PDCCH reception occasions (e.g., slots including a PDCCH search space) may be configured to be continuous. The PDCCH monitoring may not be allowed in a time period corresponding to a measurement gap, regardless of whether DRX is configured.

Table 11 shows UE procedures related to DRX (in the RRC_CONNECTED state). Referring to Table 11, DRX configuration information may be received by higher layer (RRC) signaling, and DRX ON/OFF may be controlled by a DRX command of the MAC layer. Once DRX is configured, the UE may perform the PDCCH monitoring discontinuously while executing the procedures and/or methods described/proposed in various embodiments of the present disclosure.

TABLE 11

| | Type of signals | UE procedure |
|---|---|---|
| 1$^{st}$ step | RRC signalling (MAC-CellGroupConfig) | Receive DRX configuration information |
| 2$^{nd}$ step | MAC CE ((Long) DRX command MAC CE) | Receive DRX command |
| 3$^{rd}$ step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information for the definition of DRX
  Value of drx-OnDurationTimer: defines the duration at the beginning of a DRX cycle.
  Value of drx-InactivityTimer: defines the duration in which the UE is in the awake state after a PDCCH occasion in which a PDCCH indicating initial UL or DL data is detected.
  Value of drx-HARQ-RTT-TimerDL: defines the maximum duration until DL retransmission is received after reception of initial DL transmission.
  Value of drx-HARQ-RTT-TimerDL: defines the maximum duration until a grant for UL retransmission is received after reception of a grant for initial UL transmission.
  drx-LongCycleStartOffset: defines the duration and starting time of a DRX cycle.
  drx-ShortCycle (optional): defines the duration of a short DRX cycle.
When any one of drx-OnDurationTimer, drx-InactivityTimer, drx-HARQ-RTT-TimerDL, and drx-HARQ-RTT-TimerDL is running, the UE performs the PDCCH monitoring in each PDCCH occasion while maintaining the awake state.

3.5.2. RRC_IDLE DRX

In the RRC_IDLE and RRC_INACTIVE states, DRX may be used to receive paging signals discontinuously. For clarity of description, DRX performed in the RRC_IDLE (or RRC_INACTIVE) state is referred to as RRC_IDLE DRX.

When DRX is configured, PDCCH monitoring/reception may be performed discontinuously in the time domain while the above-described/proposed procedures and/or methods are performed.

Referring to FIG. 21(b), DRX may be configured to receive paging signals discontinuously. The UE may receive DRX configuration information from the BS through higher layer (e.g., RRC) signaling. The DRX configuration information may include configuration information on a DRX cycle, a DRX offset, and a DRX timer, etc. The UE repeats an ON duration and a Sleep duration. The UE may operate in wakeup mode for the ON duration and operate in sleep mode for the Sleep duration. In the wakeup mode, the UE may monitor a paging occasion (PO) to receive a paging message. The PO refers to a time resource/period (e.g., subframe, slot, etc.) for the UE to expect the reception of the paging message. PO monitoring includes monitoring of a PDCCH (MPDCCH, NPDCCH, etc.) scrambled with a P-RNTI on the PO (hereinafter such a PDCCH is referred to as a paging PDCCH). The paging message may be included in the paging PDCCH or included in a PDSCH scheduled by the paging PDCCH. One or multiple POs may be included in a paging frame (PF), and the PF may be periodically configured based on a UE ID. Here, the PF may correspond to one radio frame, and the UE ID may be determined based on the international mobile subscriber identity (IMSI) of the UE. If DRX is configured, the UE monitors only one PO for each DRX cycle. When the UE receives a paging message indicating a change in the ID and/or system information for the UE on the PO, the UE may perform the RACH procedure to initialize (or reset) the connection to the BS or receive (or obtain) new system information from the BS. In summary, the UE may perform the PO monitoring discontinuously in the time domain to perform the RACH procedure for the connection to the BS or to receive (or obtain) new system information while performing the above-described/proposed procedures and/or methods.

The above-described initial access process and/or DRX operation may be combined with the details described in sections 1 to 3 to implement other various embodiments of the present disclosure. This may be clearly understood by those of ordinary skill in the art.

Figure 22:
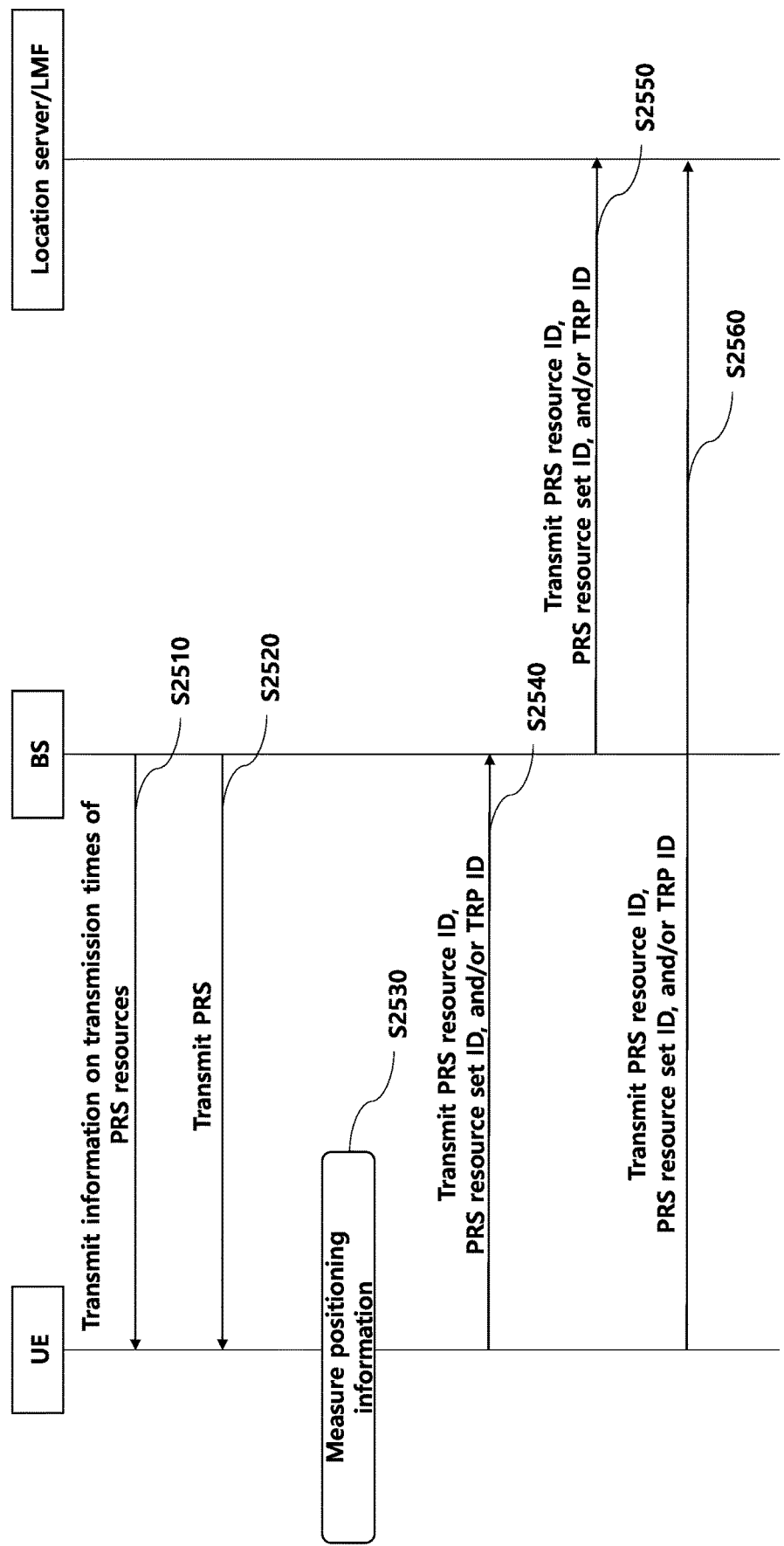
FIG. 22 is a diagram schematically illustrating operating methods for a UE and a BS according to various embodiments of the present disclosure.

FIG. 22 is a diagram schematically illustrating operating methods for the UE and the BS according to various embodiments of the present disclosure.

Referring to FIG. 22, the BS may transmit information on transmission times of a plurality of PRSs included in at least one PRS resource set to the UE in step S2510. That is, the UE may receive the information on the transmission times from the BS.

In step S2520, the BS may transmit the plurality of PRSs included in the at least one PRS resource set to the UE based on the information on the transmission times. That is, the UE may receive the plurality of PRSs transmitted from the BS.

In step S2530, the UE may measure positioning related information for the plurality of received PRSs. For example, the positioning related information may include the above-described UE RX-TX time difference, propagation delay time, ToA, ToF, and RSTD.

In step S2540, the UE may transmit at least one of the ID of a specific PRS resource among the plurality of PRSs and the ID of a PRS resource set including the specific PRS resource and the ID of a TRP related to the PRS resource set including the specific PRS resource, based on the positioning related information measured in step S2530. The BS may receive the IDs.

In step S2550, the BS may forward the at least one of the ID of the specific PRS resource and the ID of the specific PRS resource set, and the TRP ID related to the PRS resource set including the specific PRS resource, which are received from the UE, to the location server and/or LMF. The location server and/or LMF may receive the IDs.

In step S2560, the UE may transmit the at least one of the ID of the specific PRS resource among the plurality of PRSs and the ID of the PRS resource set including the specific PRS resource and the TRP ID related to the PRS resource set including the specific PRS resource, based on the positioning related information measured in step S2530. The location server and/or LMF may receive the IDs.

Steps S2540 to S2550 and S2560 described above may be performed selectively or together.

Figure 23:
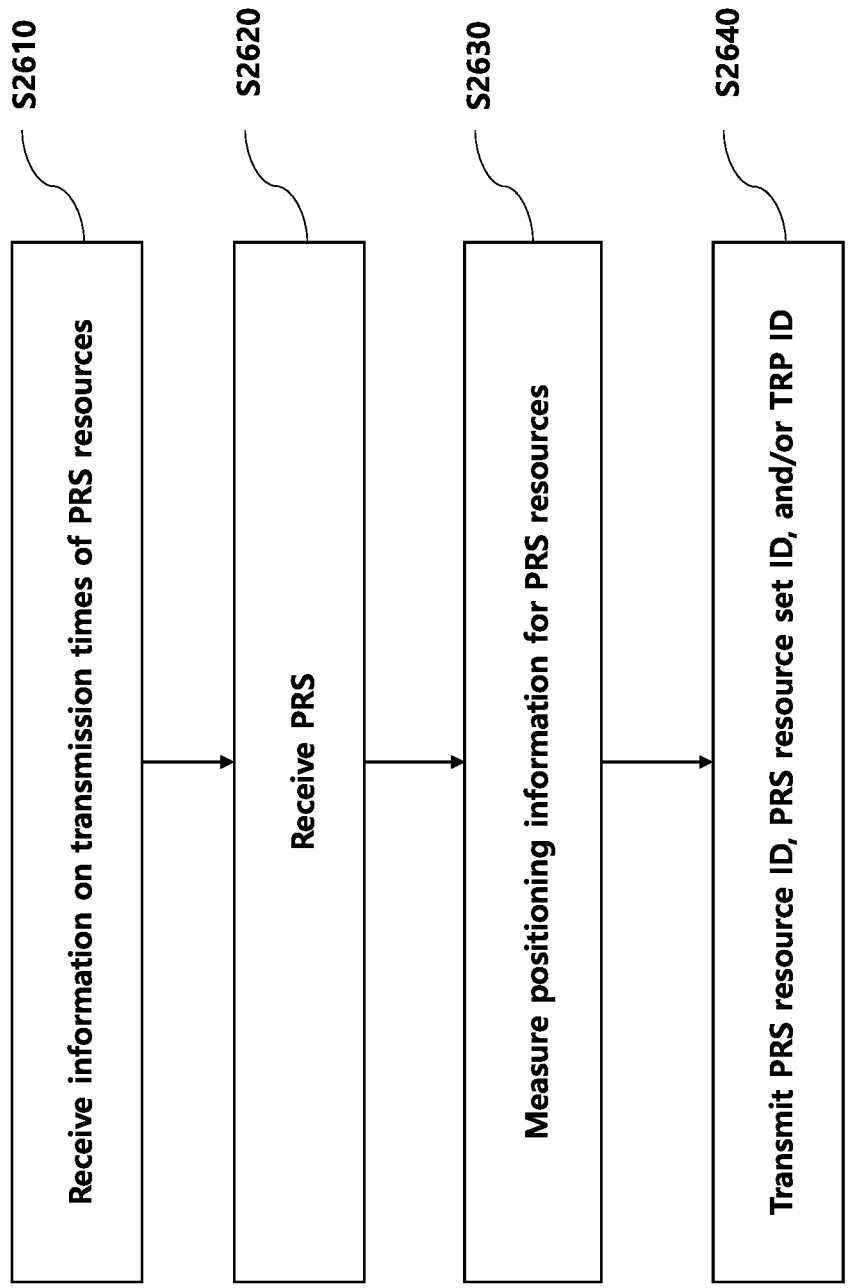
FIG. 23 is a flowchart illustrating an operating method for a UE according to various embodiments of the present disclosure.

FIG. 23 is a flowchart illustrating an operating method for the UE according to various embodiments of the present disclosure.

Referring to FIG. 23, the UE may receive information on transmission times of a plurality of PRSs included in at least one PRS resource set from the BS in step S2610.

In step S2620, the UE may receive the plurality of PRSs included in the at least one PRS resource set from the BS based on the information on the transmission times.

In step S2630, the UE may measure positioning related information for the plurality of received PRSs. For example, the positioning related information may include the above-described UE RX-TX time difference, propagation delay time, ToA, ToF, and RSTD.

In step S2640, the UE may transmit at least one of the ID of a specific PRS resource among the plurality of PRSs and the ID of a PRS resource set including the specific PRS resource and the ID of a TRP related to the PRS resource set including the specific PRS resource, based on the positioning related information measured in step S2630.

Figure 24:
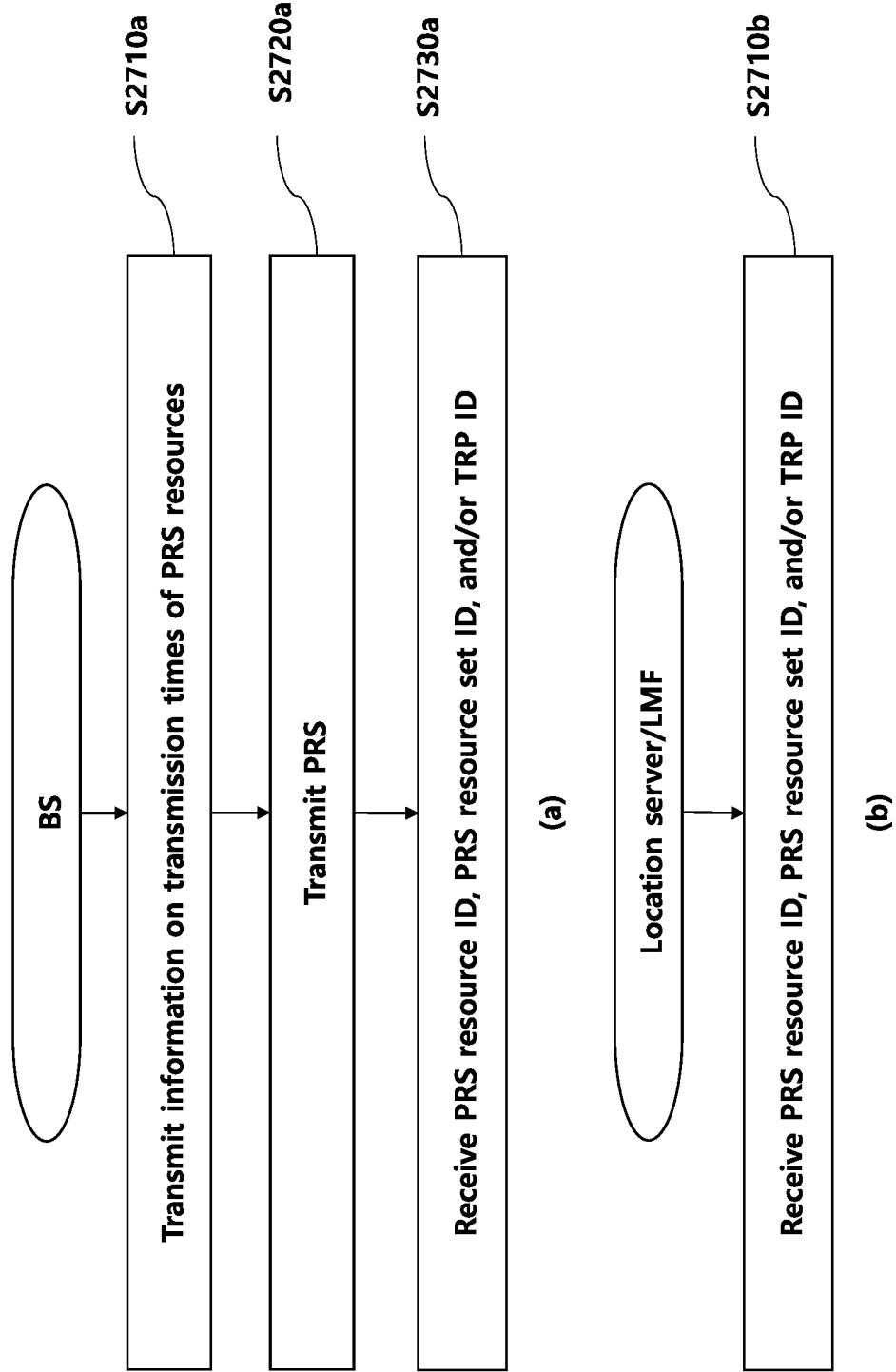
FIG. 24 is a flowchart illustrating an operating methods for a BS and a location server according to various embodiments of the present disclosure.

FIG. 24 is a flowchart illustrating an operating methods for the BS and the location server according to various embodiments of the present disclosure.

Referring to FIG. 24(a), the BS may transmit information on transmission times of a plurality of PRSs included in at least one PRS resource set to the UE in S2710a.

In step S2720a, the BS may transmit the plurality of PRSs included in the at least one PRS resource set to the UE based on the information on the transmission times.

In step S2730a, the BS may receive at least one of the ID of a specific PRS resource among the plurality of PRSs and the ID of a PRS resource set including the specific PRS resource and the ID of a TRP related to the PRS resource set including the specific PRS resource, based on positioning related information measured by the UE.

Referring to FIG. 24(b), in step S2710b, the location server and/or LMF may receive, from the BS and/or UE, at least one of the ID of a specific PRS resource among the plurality of PRSs and the ID of a PRS resource set including the specific PRS resource and the ID of a TRP related to the PRS resource set including the specific PRS resource, based on positioning related information measured by the UE.

Particular operations of the BS and/or UE according to various embodiments of the present disclosure may be explained and performed based on the details described in sections 1 to 3.

It is obvious that each of the examples of the proposed methods may also be included as one of various embodiments of the present disclosure, and thus each example may be regarded as a kind of proposed method. Although the proposed methods may be implemented independently, some of the proposed methods may be combined (or merged) and implemented. In addition, it may be regulated that information on whether the proposed methods are applied (or information on rules related to the proposed methods) are transmitted from the BS to the UE through a predefined signal (e.g., a physical layer signal, a higher layer signal, etc.).

4. Device Configurations for Implementing Various Embodiments of the Present Disclosure 4.1 Device Configurations Applicable to Various Embodiments of the Present Disclosure FIG. 25 is a diagram illustrating a device for implementing various embodiments of the present disclosure.

Figure 25:
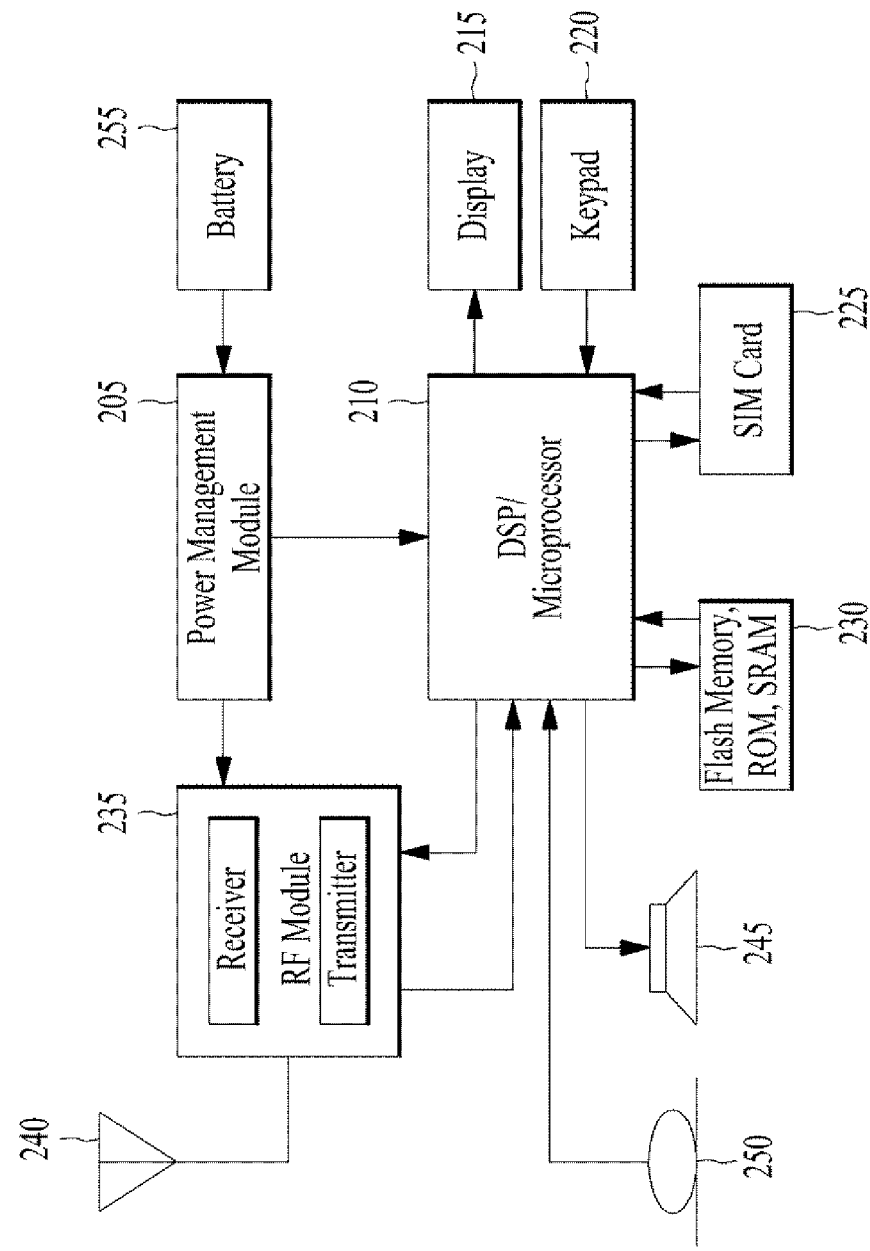
FIG. 25 is a diagram illustrating a device for implementing various embodiments of the present disclosure.

The device shown in FIG. 25 may be a UE and/or a BS (e.g., eNB or gNB) configured to perform the above-described mechanism or any device configured to perform the same operation.

Referring to FIG. 25, the device may include a digital signal processor (DSP)/microprocessor 210 and a radio frequency (RF) module (transceiver) 235. The DSP/microprocessor 210 is electrically connected to the transceiver 235 and controls the transceiver 235. The device may further include a power management module 205, a battery 255, a display 215, a keypad 220, a subscriber identity module (SIM) card 225, a memory device 230, an antenna 240, a speaker 245, and an input device 250 depending on designer's choice In particular, the device shown in FIG. 25 may be a UE including a receiver 235 configured to receive a request message from a network and a transmitter 235 configured to transmit information about transmission and reception timings to the network. The receiver and transmitter may be implemented as a transceiver 235. The UE may further include a processor 210 connected to the transceiver 235.

In addition, the device shown in FIG. 25 may be a network device including a transmitter 235 configured to transmit a request message to a UE and a receiver 235 configured to receive information about transmission and reception timings from the UE. The transmitter and receiver may be implemented as a transceiver 235. The network device may further include a processor 210 connected to the transmitter and receiver. The processor 210 may be configured to calculate latency based on the transmission and reception timing information.

According to various embodiments of the present disclosure, each of the processor of the UE (or a communication device included in the UE) and the processor of the BS (or a communication device included in the BS) may perform the following operations by controlling the memory.

According to various embodiments of the present disclosure, the UE or BS may include at least one transceiver; at least one memory; and at least one processor connected to the transceiver and memory. The memory may be configured to store instructions that, when executed, cause the at least one processor to perform the following operations.

The communication device included in the UE or BS may be configured to include the at least one processor and the at least one memory. The communication device may include or may not include the at least one transceiver. In the latter, the communication device may be connected to the at least one transceiver.

According to various embodiments of the present disclosure, the processor of the UE (or at least one processor of the communication device included in the UE) may be configured to measure positioning related information for each of a plurality of PRS resources included in at least one PRS resource set.

According to various embodiments of the present disclosure, the processor of the BS (or at least one processor of the communication device included in the BS) may be configured to transmit at least any one of the ID of a specific PRS resource among the plurality of PRS resources and the ID of a PRS resource set including the specific PRS resource Particular operations of the processor of the BS and/or UE according to various embodiments of the present disclosure may be explained and performed based on the details described in sections 1 to 3.

Meanwhile, various embodiments of the present disclosure may be combined/coupled and implemented unless they collide with each other. For example, (the processor of) the BS and/or UE according to various embodiments of the present disclosure may perform operations obtained by combining/coupling the embodiments described above in sections 1 to 3 unless they collide with each other.

4.2. Example of Communication System to Which Various Embodiments of the Present Disclosure Are Applied In this document, various embodiments of the present disclosure have been described based on data transmission and reception between a BS and a UE in a wireless communication system. However, the embodiments of the present disclosure are not limited thereto. For example, the embodiments of the present disclosure may be related to the following technical configurations.

The various descriptions, functions, procedures, proposals, methods, and/or operational flowcharts of the present invention described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise FIG. 26 illustrates a communication system applied to various embodiments of the present disclosure.

Figure 26:
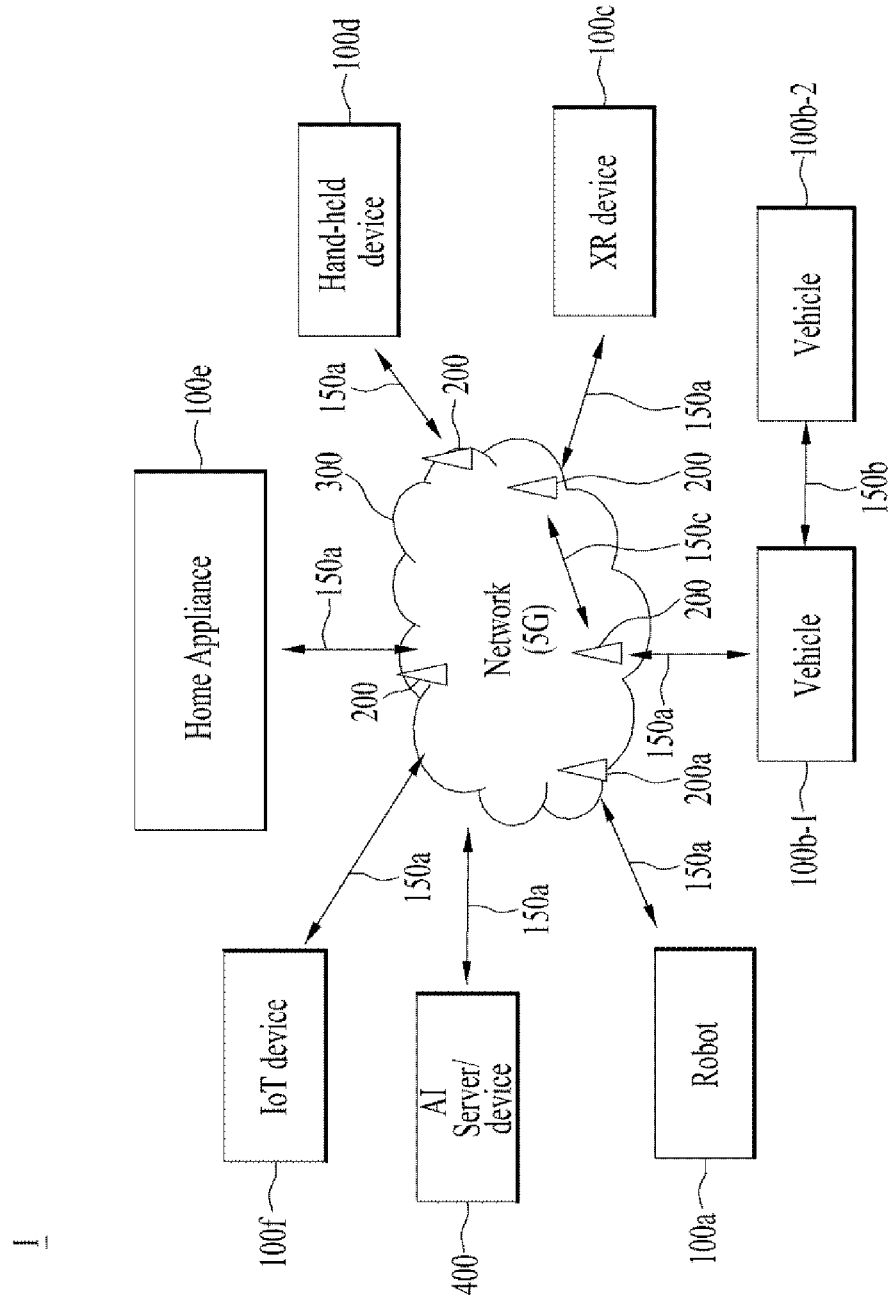
FIG. 26 illustrates a communication system applied to various embodiments of the present disclosure.

Referring to FIG. 26, a communication system applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Figure 27:
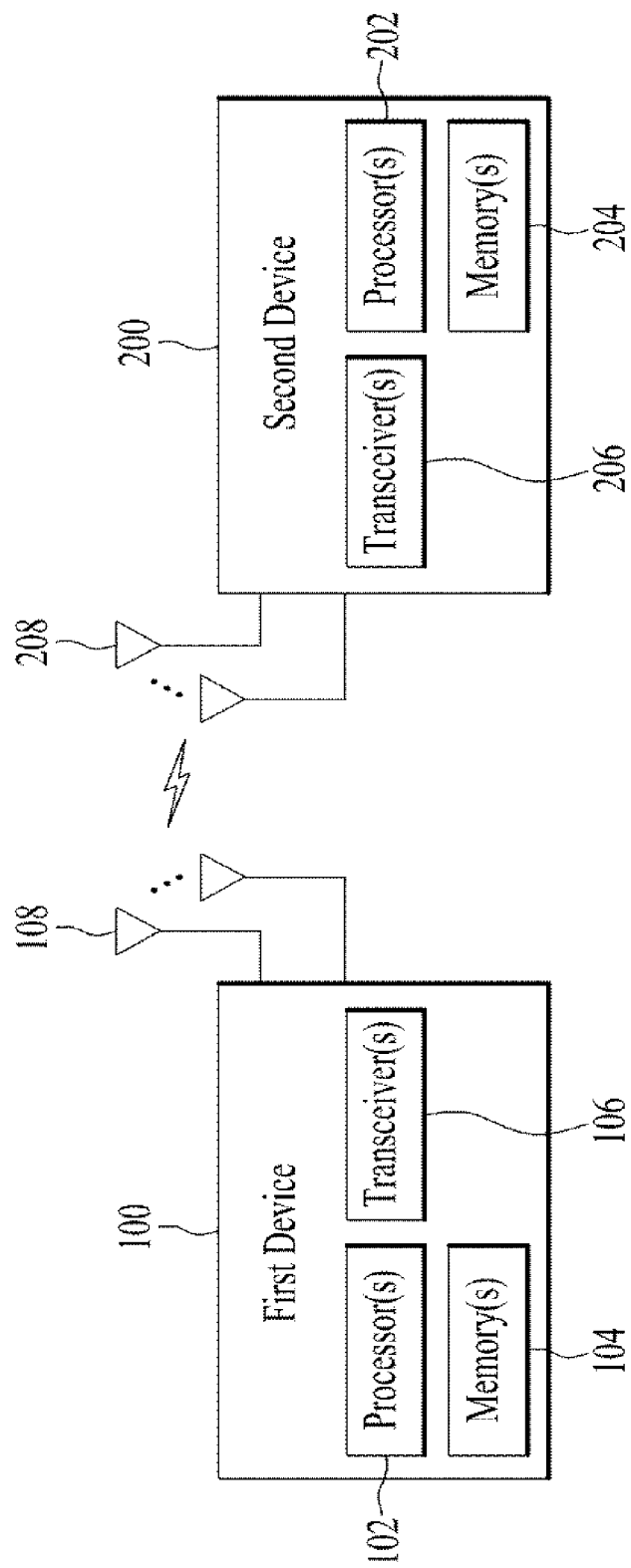
FIG. 27 illustrates wireless devices applicable to various embodiments of the present disclosure.

4.2.1 Example of Wireless Devices to which Various Embodiments of the Present Disclosure is Applied FIG. 27 illustrates wireless devices applicable to various embodiments of the present disclosure.

Referring to FIG. 27, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 27.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 28:
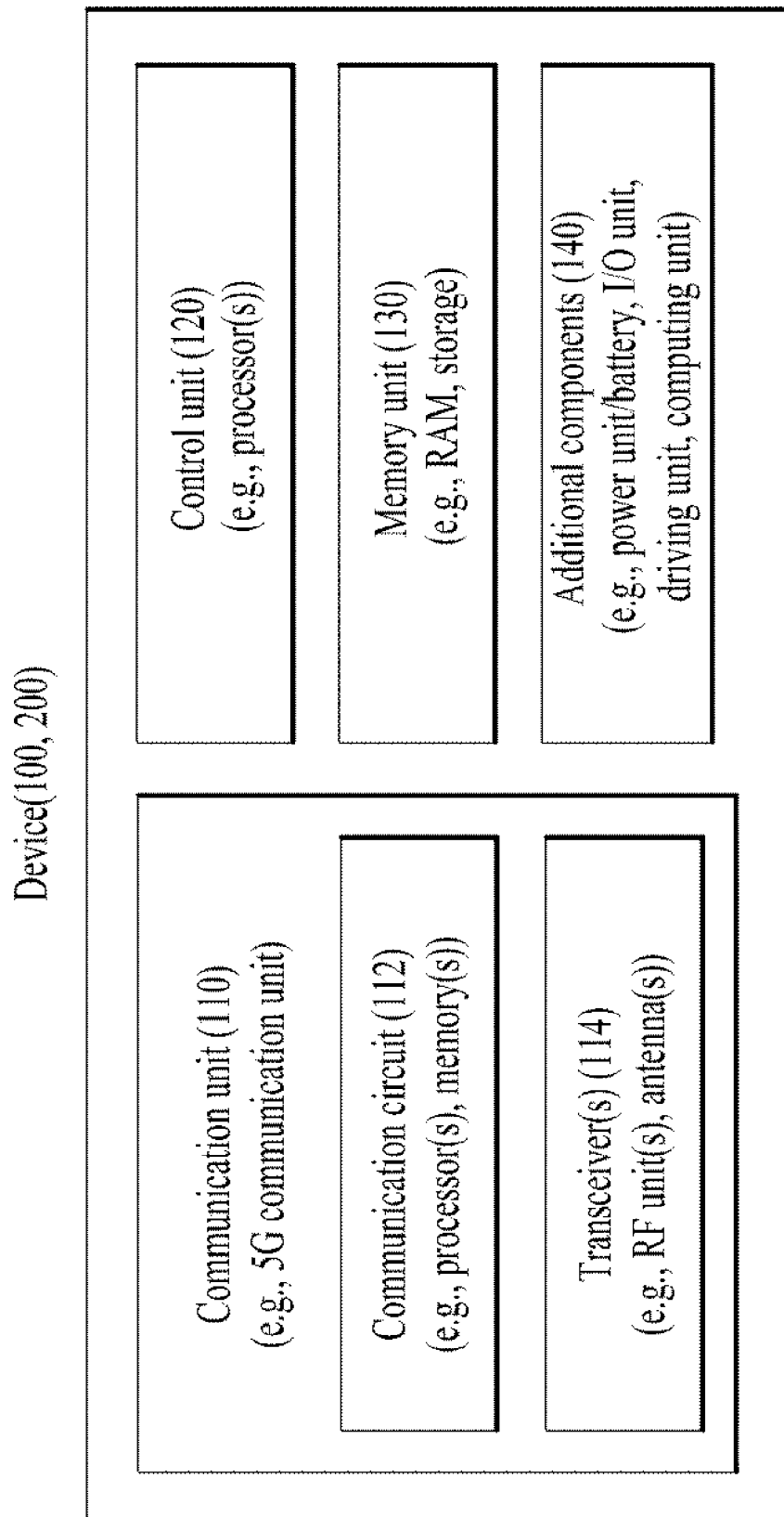
FIG. 28 illustrates another example of a wireless device applied to various embodiments of the present invention.

4.2.2. Application Example of a Wireless Device to which Various Embodiments of the Present Disclosure is Applied FIG. 28 illustrates another example of a wireless device applied to various embodiments of the present invention. The wireless device may be implemented in various forms according to a use-case/service (refer to FIG. 26).

Referring to FIG. 28, wireless devices 100 and 200 may correspond to the wireless devices 100 and 200 of FIG. 27 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 27. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 26), the vehicles (100b-1 and 100b-2 of FIG. 26), the XR device (100c of FIG. 26), the hand-held device (100d of FIG. 26), the home appliance (100e of FIG. 26), the IoT device (100f of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 28 will be described in detail with reference to the drawings.

Figure 29:
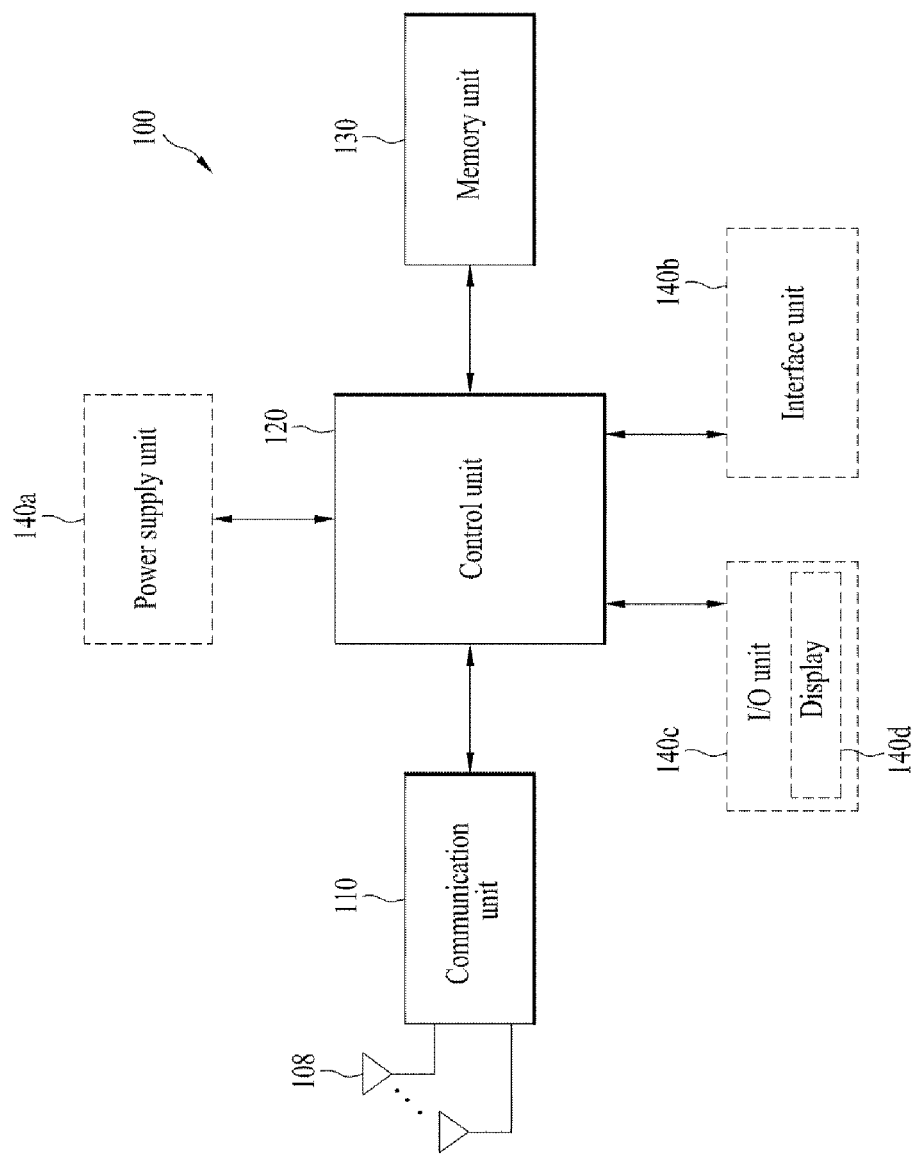
FIG. 29 illustrates a hand-held device applied to various embodiments of the present disclosure.

4.2.3. Example of Hand-Held Device to which Various Embodiments of the Present Disclosure is Applied FIG. 29 illustrates a hand-held device applied to various embodiments of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 28, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 30:
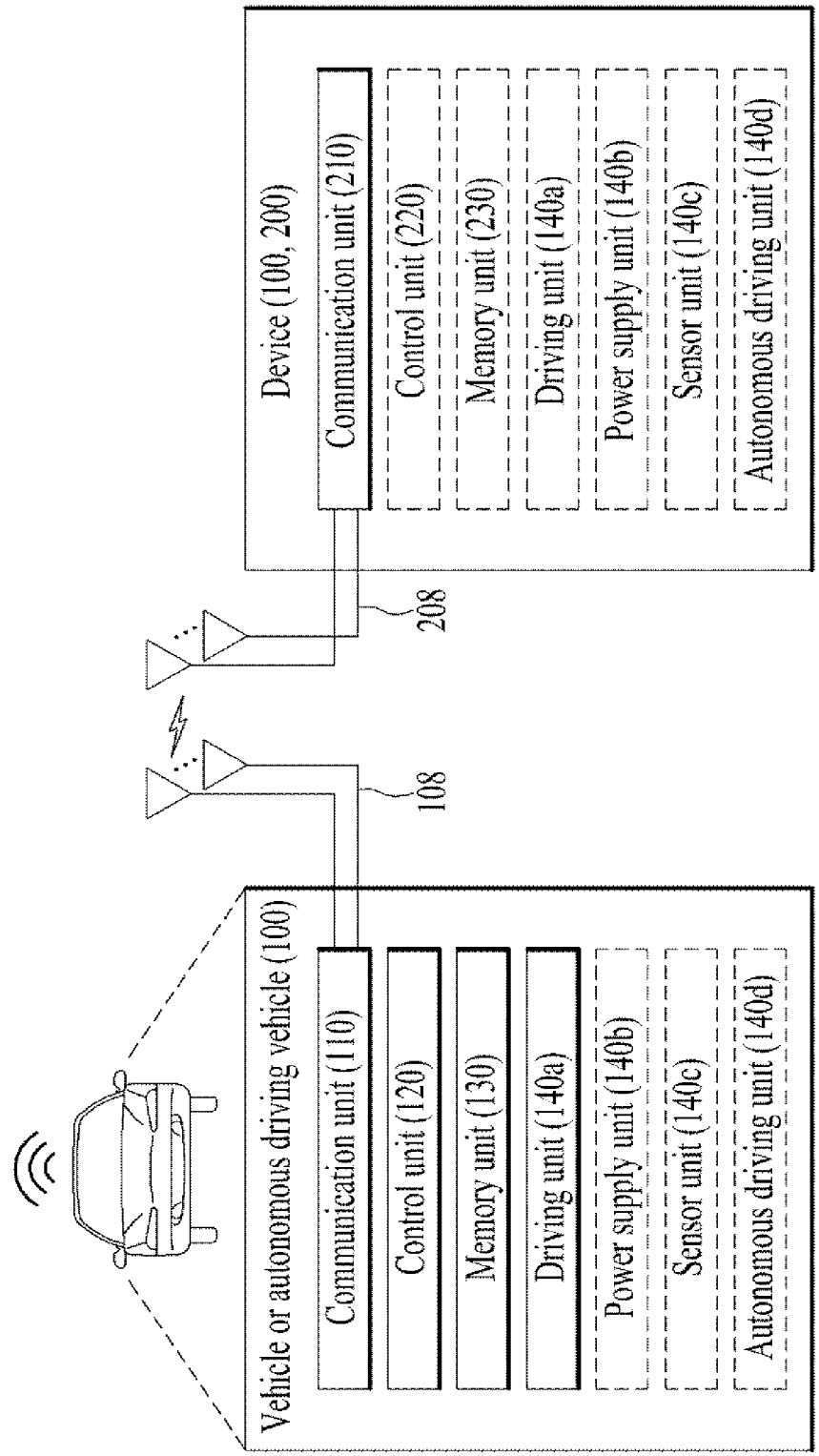
FIG. 30 illustrates a vehicle or an autonomous driving vehicle applied to various embodiments of the present invention.

4.2.4. Example of a Vehicle or an Autonomous Driving Vehicle to which Various Embodiments of the Present Disclosure is Applied FIG. 30 illustrates a vehicle or an autonomous driving vehicle applied to various embodiments of the present invention. The vehicle or autonomous driving vehicle may be implemented by a mobile robot, a car, a train, a manned/unmanned Aerial Vehicle (AV), a ship, etc.

Referring to FIG. 30, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 31:
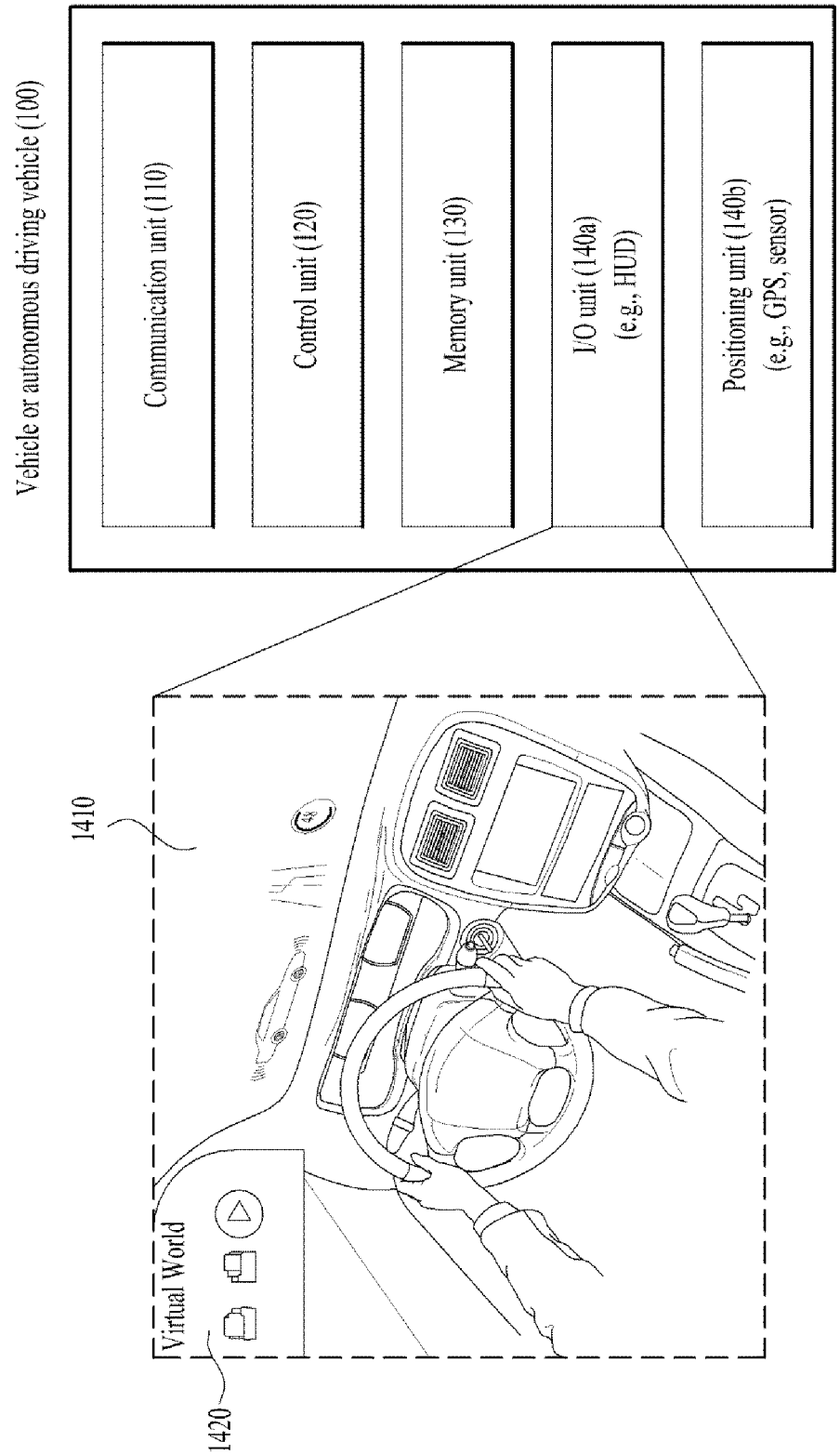
FIG. 31 illustrates a vehicle applied to various embodiments of the present disclosure.

4.2.5. Examples of AR/VR and Vehicle to which Various Embodiments of the Present Disclosure is Applied FIG. 31 illustrates a vehicle applied to various embodiments of the present disclosure. The vehicle may be implemented as a transport means, an aerial vehicle, a ship, etc.

Referring to FIG. 31, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 28.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented by means of a prescribed device and/or a UE.

For example, the prescribed device may include a BS, a network node, a transmitting UE, a receiving UE, a wireless device, a wireless communication device, a vehicle, a vehicle with autonomous driving functions, a drone (unmanned aerial vehicle (UAV)), an artificial intelligence (AI) module, a robot, an augmented reality (AR) device, a virtual reality (VR) device, or other devices.

For example, the UE may be a personal digital assistant (PDA), a cellular phone, a personal communication service (PCS) phone, a global system for mobile (GSM) phone, a wideband CDMA (WCDMA) phone, a mobile broadband system (MBS) phone, a smartphone, or multi-mode multi-band (MM-MB) terminal.

The smartphone refers to a terminal with the advantages of both a mobile communication terminal and a personal portable terminal. Specifically, the smartphone may mean a terminal obtained by incorporating data communication functions such as schedule management, fax transmission/reception, and Internet access, which are functions of the personal portable terminal, into the mobile communication terminal.

The MB-MM terminal refers to a terminal that has a built-in multi-modem chip and operates in both portable Internet systems and other mobile communication systems (e.g., CDMA 2000 systems, WCDMA systems, etc.). Alternatively, the UE may be a laptop personal computer (PC), a handheld PC, a tablet PC, an ultrabook, a slate PC, a digital broadcasting terminal, a portable multimedia player (PMP), a navigation device, or a wearable device (for example, a watch-type terminal device (smartwatch), a glass-type terminal device (smart glass), a head mounted display (HMD)). For example, the drone may be a flying object controlled by radio control signals without a human pilot. For example, the HMD may be a display device worn on the head. The HMD may be used to implement VR or AR.

The embodiments of the present disclosure may be achieved by various means, for example, hardware, firmware, software, or any combination thereof.

In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Various embodiments of the present disclosure may be carried out in other specific ways than those set forth herein without departing from the spirit and essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an implementation of the present disclosure or included as a new claim by a subsequent amendment after the application is filed.

INDUSTRIAL APPLICABILITY

Various embodiments of the present disclosure are applicable to various wireless access systems including 3rd Generation Partnership Project (3GPP) and 3GPP2 systems. The embodiments of the present disclosure are also applicable not only to the various wireless access systems but also to all technical fields in which the wireless access systems find their applications. Further, the proposed methods may be applied to mmWave communication systems based on ultra-high frequency bands.

The invention claimed is:

1. A method of transmitting location related information by a user equipment (UE) in a wireless communication system, the method comprising:
   receiving a plurality of downlink (DL) positioning reference signal (PRS) configurations for a plurality of transmission and reception points (TRPs), wherein each of the plurality of DL PRS configurations is related to a single TRP;
   receiving a location information request;
   performing positioning related measurements based on the plurality of DL PRS configurations; and
   transmitting a location information message, based on the location information request and the positioning related measurements, wherein the location information message includes, for each of the plurality of TRPs;
   i) at least one positioning related measurement value; and based on the location information request including information for requesting the UE to report an identifier (ID) associated with a DL PRS resource or DL PRS resource set which is used in determining the positioning related measurements,
   ii) an ID of a DL PRS resource set related to the at least one positioning related measurement value among DL PRS resource sets related to a corresponding TRP or an ID of a DL PRS resource related to the at least one positioning related measurement value among DL PRS resources in the DL PRS resource set.

2. The method of claim 1, wherein based on the location information request being related to multiple round trip time (multi-RTT) measurements from the UE, each of the at least one positioning related measurement value includes a UE reception-transmission (Rx-Tx) time difference value.

3. The method of claim 2, wherein based on the location information including information regarding a number of M positioning related measurements per TRP, the location information message includes up to M UE Rx-Tx time difference values for each of the plurality of TRPs.

4. The method of claim 1, wherein based on the location information request being related to DL time difference of arrival (DOA) measurements from the UE, each of the at least one positioning related measurement value includes a DL reference signal time difference (RSTD) value.

5. The method of claim 4, wherein based on the location information including information regarding a number of M positioning related measurements per TRP, the location information message includes up to M DL RSTD values for each of the plurality of TRPs.

6. The method of claim 1, wherein the location information message includes related identification information for each of the plurality of TRPs.

7. A user equipment (UE) for transmitting location related information in a wireless communication system, the UE comprising:
   at least one transceiver;
   at least one processor; and
   at least one memory storing at least one instructions that, when executed, cause the at least one processor to perform operations comprising:
   receiving a plurality of downlink (DL) positioning reference signal (PRS) configurations for a plurality of transmission and reception points (TRPs), wherein each of the plurality of DL PRS configurations is related to a single TRP;
   receiving a location information request;
   performing positioning related measurements based on the plurality of DL PRS configurations; and
   transmitting a location information message, based on the location information request and the positioning related measurements,
   wherein the location information message includes, for each of the plurality of TRPs:
   i) at least one positioning related measurement value; and based on the location information request including information for requesting the UE to report an identifier (ID) associated with a DL PRS resource or DL PRS resource set which is used in determining the positioning related measurements,
   ii) an ID of a DL PRS resource set related to the at least one positioning related measurement value among DL PRS resource sets related to a corresponding TRP or an ID of a DL PRS resource related to the at least one positioning related measurement value among DL PRS resources in the DL PRS resource set.

8. The UE of claim 7, wherein based on the location information request being related to multiple round trip time (multi-RTT) measurements from the UE, each of the at least one positioning related measurement value includes a UE reception-transmission (Rx-Tx) time difference value.

9. The UE of claim 8, wherein based on the location information including information regarding a number of M positioning related measurements per TRP, the location information message includes up to M UE Rx-Tx time difference values for each of the plurality of TRPs.

10. The UE of claim 7, wherein based on the location information request being related to DL time difference of arrival (DOA) measurements from the UE, each of the at least one positioning related measurement value includes a DL reference signal time difference (RSTD) value.

11. The UE of claim 10, wherein based on the location information including information regarding a number of M positioning related measurements per TRP, the location information message includes up to M DL RSTD values for each of the plurality of TRPs.

12. The UE of claim 7, wherein the location information message includes related identification information for each of the plurality of TRPs.

13. A location server for receiving location related information in a wireless communication system, the location server comprising:
   at least one processor; and
   at least one memory storing at least one instructions that, when executed, cause the at least one processor to perform operations comprising:
   transmitting, to a user equipment (UE), a plurality of downlink (DL) positioning reference signal (PRS) configurations for a plurality of transmission and reception points (TRPs), wherein each of the plurality of DL PRS configurations is related to a single TRP;
   transmitting, to the UE, a location information request;
   receiving, from the UE, a location information message, based on the plurality of DL PRS configurations and the location information request,
   wherein the location information message includes, for each of the plurality of TRPs:
   i) at least one positioning related measurement value; and based on the location information request including information for requesting the UE to report an identifier (ID) associated with a DL PRS resource or DL PRS resource set which is used in determining the positioning related measurements, ii) an ID of a DL PRS resource set related to the at least one positioning related measurement value among DL PRS resource sets related to a corresponding TRP or an ID of a DL PRS resource related to the at least one positioning related measurement value among DL PRS resources in the DL PRS resource set.

14. The location server of claim 13, wherein based on the location information request being related to multiple round trip time (multi-RTT) measurements from the UE, each of the at least one positioning related measurement value includes a UE reception-transmission (Rx-Tx) time difference value.

15. The location server of claim 14, wherein based on the location information including information regarding a number of M positioning related measurements per TRP, the location information message includes up to M UE Rx-Tx time difference values for each of the plurality of TRPs.

16. The location server of claim 13, wherein based on the location information request being related to DL time difference of arrival (DOA) measurements from the UE, each of the at least one positioning related measurement value includes a DL reference signal time difference (RSTD) value.

17. The location server of claim 16, wherein based on the location information including information regarding a number of M positioning related measurements per TRP, the location information message includes up to M DL RSTD values for each of the plurality of TRPs.

18. The location server of claim 13, wherein the location information message includes related identification information for each of the plurality of TRPs.

* * * * *